(12) United States Patent
Sjögren et al.

(10) Patent No.: US 12,001,935 B2
(45) Date of Patent: *Jun. 4, 2024

(54) COMPUTER-IMPLEMENTED METHOD, COMPUTER PROGRAM PRODUCT AND SYSTEM FOR ANALYSIS OF CELL IMAGES

(71) Applicant: SARTORIUS STEDIM DATA ANALYTICS AB, Umeå (SE)

(72) Inventors: Rickard Sjögren, Umeå (SE); Johan Trygg, Umeå (SE)

(73) Assignee: SARTORIUS STEDIM DATA ANALYTICS AB, Umeå (SE)

( * ) Notice: Subject to any disclaimer, the term of this patent is extended or adjusted under 35 U.S.C. 154(b) by 527 days.

This patent is subject to a terminal disclaimer.

(21) Appl. No.: 17/273,712

(22) PCT Filed: Sep. 5, 2019

(86) PCT No.: PCT/EP2019/073695
§ 371 (c)(1),
(2) Date: Mar. 4, 2021

(87) PCT Pub. No.: WO2020/049098
PCT Pub. Date: Mar. 12, 2020

(65) Prior Publication Data
US 2021/0350113 A1 Nov. 11, 2021

(30) Foreign Application Priority Data
Sep. 5, 2018 (EP) .................................... 18192649
Jun. 18, 2019 (EP) .................................... 19180972

(51) Int. Cl.
G06F 18/213 (2023.01)
G06F 18/22 (2023.01)
(Continued)

(52) U.S. Cl.
CPC ............. *G06N 3/04* (2013.01); *G06F 18/213* (2023.01); *G06F 18/22* (2023.01); *G06N 3/048* (2023.01); *G06N 3/08* (2013.01); *G06V 20/698* (2022.01)

(58) Field of Classification Search
CPC ............ G06N 3/04; G06N 3/048; G06N 3/08; G06N 3/088; G06N 3/0442; G06N 3/0455;
(Continued)

(56) References Cited

U.S. PATENT DOCUMENTS 10,229,356 B1    3/2019  Liu et al.
10,997,499 B1 *  5/2021  Kayyoor ................ G06N 20/00
(Continued)

FOREIGN PATENT DOCUMENTS

CN    104881684    9/2015
CN    107655850    2/2018
(Continued)

OTHER PUBLICATIONS

International Search Report received in PCT/EP2019/073695, dated Dec. 4, 2019, 3 pages.
(Continued)

*Primary Examiner* — Bobbak Safaipour
(74) *Attorney, Agent, or Firm* — Klarquist Sparkman, LLP

(57) ABSTRACT

A computer-implemented method for analysis of cell images comprises obtaining a deep neural network and a training dataset, the deep neural network comprising a plurality of hidden layers; obtaining first sets of intermediate output values that are output from at least one of the plurality of hidden layers; constructing a latent variable model using the first sets of intermediate output values, the latent variable model mapping the first sets of intermediate output values to first sets of projected values in a sub-space that has a
(Continued)

dimension lower than the sets of the intermediate outputs; obtaining a second set of intermediate output values by inputting a received new cell image to the deep neural network; mapping, using the latent variable model, the second set of intermediate output values to a second set of projected values; and determining whether the received new cell image is an outlier.

14 Claims, 11 Drawing Sheets

(51) Int. Cl.
  *G06N 3/04*     (2023.01)
  *G06N 3/048*    (2023.01)
  *G06N 3/08*     (2023.01)
  *G06V 20/69*    (2022.01)
(58) Field of Classification Search
  CPC .... G06N 3/0464; G06N 3/092; G06F 18/213; G06F 18/22; G06V 20/698; G05B 23/024
  See application file for complete search history.

(56) References Cited

U.S. PATENT DOCUMENTS

| | | | |
|---|---|---|---|
| 11,062,229 | B1 | 7/2021 | Mnih et al. |
| 11,868,887 | B2 | 1/2024 | Kandemir et al. |
| 2013/0338965 | A1 | 12/2013 | Ide et al. |
| 2013/0339202 | A1 | 12/2013 | Zhao et al. |
| 2014/0365195 | A1 | 12/2014 | Lahiri et al. |
| 2016/0063393 | A1 | 3/2016 | Ramage et al. |
| 2019/0287230 | A1* | 9/2019 | Lu .......................... G06N 3/088 |
| 2020/0020098 | A1 | 1/2020 | Odry et al. |
| 2020/0074269 | A1* | 3/2020 | Trygg .................. G06V 10/761 |
| 2021/0011791 | A1 | 1/2021 | Okanohara et al. |
| 2021/0041953 | A1* | 2/2021 | Poltorak ................. H04W 4/80 |
| 2021/0334656 | A1* | 10/2021 | Sjögren .................... G06N 3/04 |

FOREIGN PATENT DOCUMENTS

| | | |
|---|---|---|
| CN | 107967515 | 4/2018 |
| CN | 108445752 | 8/2018 |
| KR | 10-2018-0064905 | 6/2018 |
| WO | WO 97/06418 | 2/1997 |

OTHER PUBLICATIONS

Written Opinion received in PCT/EP2019/073695, dated Dec. 4, 2019, 5 pages.
European Search Report received in European Application No. 18192649.4, dated Mar. 6, 2019, 8 pages.
European Search Report received in European Application No. 19180972.2, dated Dec. 13, 2019, 7 pages.
Office Action (w/English translation) received in related Japan Application No. 2021-512919, dated Jul. 26, 2022, 8 pages.
Dewa Made Sri Arsa et al., "Improving Principal Component Analysis Performance for Reducing Spectral Dimension in Hyperspectral Image Classification," 2018 International Workshop on Big Data and Information Security (IWBIS) IEEE, May 13, 2018, pp. 123-128, 6 pages.
Bishop, "Latent Variable Models," *Learning in Graphical Models*, M.I. Jordan (Ed), MIT Press, 1999, pp. 371-403.
Mandal, "Implementing PCA, Feedforward and Convolutional Autoencoders and using it for Image Reconstruction, Retrieval & Compression," Jan. 9, 2018, Manash's Blog, retrieved from: https://blog.manash.io/implementing-pca-feedforward-and-convulutional-autoencoders-and-using-it-for-image-reconstruction, 27 pages.
International Search Report received in PCT/EP2019/073670, dated Dec. 4, 2019, 3 pages.
Written Opinion received in PCT/EP2019/073670, dated Dec. 4, 2019, 6 pages.
"Bayesian Uncertainty Estimation for Batch Normalized Deep Networks," under review as conference paper at ICLR 2018, Feb. 2018, 27 pages.
Ilg et al., "Uncertainty Estimates and Multi-Hypotheses Networks for Optical Flow," arXiv:1802.07095v4 [cs.CV] Dec. 20, 2018, 30 pages.
Gal et al., "Dropout as a Bayesian Approximation: Representing Model Uncertainty in Deep Learning," Proceedings of the $33^{rd}$ International Conference on Machine Learning, New York, NY, 2016, 12 pages.
Blundell et al., "Weight Uncertainty in Neural Networks," Proceedings of the $32^{nd}$ International Conference on Machine Learning, Lille, France, 2015, 10 pages.
Lakshminarayanan et al., "Simple and Scalable Predictive Uncertainty Estimation using Deep Ensembles," $31^{st}$ Conference on Neural Information Processing Systems, Long Beach, CA, Nov. 4, 2017, 15 pages.
Saxena et al., "Damage Propagation Modeling for Aircraft Engine Run-to-Failure Simulation," 2008 International Conference on Prognostics and Health Management, Oct. 2008, 10 pages.
Hochreiter et al., "Long Short-Term Memory," Neural Computation 9(8): 1997, pp. 1735-1780.
Gers et al., "Learning to Forget: Continual Prediction with LSTM," Neural Computation, 12, (2000), pp. 2451-2471, (70 pages w/citations).
Kingma et al., "ADAM: A Method for Stochastic Optimization," published as conference paper at ICLR 2015, 2015, pp. 1-15.
Latecki et al., "Outlier Detection with Kernel Density Functions," Machine Learning and Data Mining in Pattern Recognition, Jul. 2007, pp. 61-75.
Osband et al., "Deep Exploration via Bootstrapped DQN," Advances in Neural Information Processing Systems, Jul. 2016, pp. 4026-4034.
Ritter et al., "A Scalable Laplace Approximation for Neural Networks," published as a conference paper at ICLR 2018, Feb. 2018, 15 pages.
Jenatton et al., "Structured Sparse Principal Component Analysis," appearing in *Proceedings of the $13^{th}$ International Conference on Artificial Intelligence and Statistics*, vol. 9, Mar. 2010, 8 pages.
Kingma et al., "Auto-Encoding Variational Bayes," ARXIV Preprint, ARXIV:1312.6114, 2103, May 2014, 14 pages.
Makhzani et al., "k-Sparse Autoencoders," International Conference on Learning Representations, ICLR Mar. 2014, 9 pages.
Li et al., "Transforming Cooling Optimization for Green Data Center via Deep Reinforcement Learning," arXiv:1709.050774v4 [cs.AI] Jul. 2018, 11 pages.
Dasgupta, "Experiments with Random Projection," Uncertainty in Artificial Intelligence Proceedings 2000, Jun. 2000, pp. 143-151.
Lazarevic et al., "Feature Bagging for Outlier Detection," KDD '05, Aug. 21-24, 2005, Chicago, IL, pp. 157-166.
Wold et al., "PLS-regression: a basic tool of chemometrics," Chemometrics and Intelligent Laboratory Systems, 58(2001), 2001, pp. 109-130.
Xiao et al., "Fashion-MNIST: a Novel Image Dataset for Benchmarking Machine Learning Algorithms," https://trends.google.com/trends/explore?data-all&q=mnist,CIFAR,imageNet, Aug. 2017, 6 pages.
LeCun et al., "The MNIST Database of handwritten digits," Jun. 21, 2018, 9 pages, http://yann.lecun.com/exdb/mnist.
Rousseeuw, "Least Median of Squares Regression," Journal of the American Statistical Association, vol. 79, No. 388, Dec. 1984, pp. 871-880.
Rousseeuw, "Multivariate Estimation with High Breakdown Point," Mathematical Statistics and Applications (1985) pp. 283-297.
Deng et al., "ImageNet: A Large Scale Hierarchical Image Database," 2009 IEEE Conference on Computer Vision and Pattern Recognition, 2009, pp. 248-255.
Szegedy et al., "Rethinking the Inception Architecture for Computer Vision," Proceedings of the IEEE Conference on Computer Vision and Pattern Recognition, 2016, pp. 2818-2826.

(56) References Cited

OTHER PUBLICATIONS

Lin et al., "Network in Network," arXiv 3124400 CS, Dec. 2013, pp. 1-10.
Achlioptas, "Database-friendly random projections: Johnson-Lindenstrauss with binary coins," Journal of Computer and System Sciences 66 (2003) pp. 671-687.
Wold, "Principal Component Analysis," Chomometrics and intelligent Laboratory Systems, vol. 2, No. 1 (1987) pp. 37-52.
Breunig et al., "LOF: Identifying Density-Based Local Outliers," Proceedings of the 2000 ACM SIGMOD International Conference on Management of Data, 2000, pp. 93-104.
Liu et al., "Neural Networks with Enhanced Outlier Rejection Ability for Off-Line Handwritten Word Recognition," 2002, Pattern Recognition 35, 11 pages.
Goldberger et al., "Neighborhood Component Analysis," 2004, Advances in Neural Information Processing Systems 17, 8 pages.
Said et al., "Data Preprocessing for Distance-based Unsupervised Intrusion Detection," 2011, $9^{th}$ Annual International Conference on Privacy, Security and Trust, 8 pages.
Yu et al., Recursive Principal Component Analysis-Based Data Outlier Detection and Sensor Data Aggregation in IoT Systems, 2017, IEEE Internet of Things Journal, vol. 4, No. 6, 10 pages.
Guo et al., "An Anomaly Detection Framework Based on Autoencoder and Nearest Neighbor," Jul. 2018, $15^{th}$ International Conference on Service Systems and Service Management, 6 pages.
Office Action (w/o English translation) issued in Chinese Application No. 201980058094.9, dated Sep. 23, 2023, 7 pages.
Office Action (w/o English translation) issued in Chinese Application No. 201980058085.X, dated Sep. 29, 2023, 8 pages.

* cited by examiner

Element-wise Addition

COMPUTER-IMPLEMENTED METHOD, COMPUTER PROGRAM PRODUCT AND SYSTEM FOR ANALYSIS OF CELL IMAGES

CROSS REFERENCE TO RELATED APPLICATIONS

This is the U.S. National Stage of International Application No. PCT/EP2019/073695, filed Sep. 5, 2019, which was published in English under PCT Article 21(2), which in turn claims the benefit of European Patent Application No. 18192649.4, filed Sep. 5, 2018 and European Patent Application No. 19180972.2 filed on Jun. 18, 2019. The applications are incorporated herein by reference in their entirety.

The application relates to a computer-implemented method, a computer program product and a system for analysis of cell images, in particular, outlier detection in unstructured data such as cell images.

BACKGROUND

Biological processes are complex on many different levels. To capture this complexity, various imaging technologies for studying and monitoring cells have been proposed. To analyze the increasing amount of cell imaging data, deep learning can be used. Deep learning is a machine learning field relying on a type of statistical model called deep neural networks. A deep neural network may be an artificial neural network having an input layer, an output layer and a plurality of hidden layers between the input and output layers.

Deep learning using deep neural networks has become very popular in many applications thanks to powerful transformations learned by deep neural networks. Deep learning has, for example, revolutionized the field of computer vision in the past half-decade rapidly surpassing previous state-of-the-art approaches on most vision tasks. Deep learning is increasingly being used in cell imaging such as live cell imaging, for cell or nucleus detection, classification of protein localization from fluorescent imagery, label-free cell classification and so on.

An application of deep learning techniques for analysis of cell images is described for example in the publication O. Z. Kraus et al., "Automated analysis of high-content microscopy data with deep learning," Molecular systems biology, vol. 13, no. 4, p. 924, 2017, and the corresponding US-2018/0137338-A1. The cited publications describe a method for training a good model for classifying cell images with lower demands on annotation of the training images.

When adopting deep learning in critical systems such as for diagnostic applications, it may be crucial to understand when predictions provided by the deep learning system should not be trusted.

In other words, it may be important to know not only whether or not a prediction provided by the deep learning system is accurate, but also whether the deep learning system should predict at all. Autonomous decisions can be improved by understanding the limits of the learned representations and by recognizing when data not recognized by the deep learning system is encountered.

Thus, a common problem in all data-driven modelling, including deep learning, is how to deal with outlier data after the model has been trained. Outlier observations may be observations that are substantially different from the data used to train the model. Since outliers substantially differ from what the model has encountered before, the model behavior is undefined in such situations, meaning that the predictions cannot be trusted. In cell imaging, outliers may be images from a cell type not seen before or some previously unobserved phenomenon. Outliers may also be due to imaging instrument error resulting in bad images or operator mismanagement of either the instrument or the data processing. In any of those cases will the model predictions be unreliable and need to be handled properly.

Many different methods have been proposed to allow deep neural networks to describe uncertainty in predictions. Many of these methods are based on training deep neural networks to perform Bayesian inference rather than point inferences during prediction. This means that rather than predicting a single point, the networks are trained to predict a distribution of possible points. The intuition is that observations the model cannot explain will have a broad distribution, or large uncertainty. One popular solution to perform Bayesian prediction is so called Monte-Carlo dropout (MC-dropout), disclosed in Y. Gal and Z. Gharamani, "Dropout as a Bayesian approximation: Representing model uncertainty in deep learning," in International Conference on Machine Learning, 2016, pp. 1050-1059. MC-dropout can be applied to neural networks that are trained using "dropout", a regularization technique for reducing overfitting in neural networks by dropping out (or in other words, ignoring) some units (e.g. neurons, nodes) in a neural network during the training phase. MC-dropout makes multiple inferences for each prediction, using so called Monte-Carlo sampling for prediction, while eliminating, or dropping out, network neurons randomly during prediction time. The different predictions vary due to dropout and describe a prediction distribution. The prediction uncertainty can then be quantified by calculating the entropy or variance of the resulting distribution.

Other methods for using dropout producing Monte-Carlo samples include: sampling based on batch-normalization parameters (M. Teye, H. Azizpour, and K. Smith, "Bayesian Uncertainty Estimation for Batch Normalized Deep Networks," ArXiv180206455 Stat, February 2018), prediction from different models in an ensemble (B. Lakshminarayanan, A. Pritzel, and C. Blundell, "Simple and scalable predictive uncertainty estimation using deep ensembles," in Advances in Neural Information Processing Systems, 2017, pp. 6405-6416), multiple "prediction heads" in a shared base network (I. Osband, C. Blundell, A. Pritzel, and B. Van Roy, "Deep exploration via bootstrapped DQN," in Advances in Neural Information Processing Systems, 2016, pp. 4026-4034; E. Ilg et al., "Uncertainty Estimates for Optical Flow with Multi-Hypotheses Networks," ArXiv180207095 Cs, February 2018), variational inference of weight distribution instead of regular point weights (C. Blundell, J. Cornebise, K. Kavukcuoglu, and D. Wierstra, "Weight uncertainty in neural networks," ArXiv Prepr. ArXiv150505424, 2015) and Laplace approximation of distribution from existing weights (H. Ritter, A. Botev, and D. Barber, "A Scalable Laplace Approximation for Neural Networks," February 2018).

However, these methods place assumptions on what type of model is used and may constrain how the network is constructed or trained, and/or rely on multiple inferences per prediction. This may limit their general applicability for real-time systems where making multiple inferences is impractical and/or for existing systems that do not fit into the constraints.

SUMMARY

According to an aspect, the problem relates to efficiently evaluating reliability of a prediction given by a deep neural network for a cell image input to the deep neural network.

This problem is solved by the features disclosed by the independent claims. Further exemplary embodiments are defined by the dependent claims.

According to an aspect, a computer-implemented method for analysis of cell images is provided. The cell images may be obtained by any suitable imaging technique, for example by optical microscopy (e.g. bright-field microscopy, phase contrast microscopy, fluorescent microscopy, confocal imaging microscopy), electronic beam microscopy, etc. The cell images may be live cell images or non-live cell images.

The method includes:
- obtaining a deep neural network and at least a part of a training dataset used for training the deep neural network, the deep neural network comprising a plurality of hidden layers and being trained by using the training dataset, the training dataset including a plurality of possible cell images (i.e. observations) that can be input to the deep neural network;
- obtaining first sets of intermediate output values that are output from at least one of the plurality of hidden layers, each of the first sets of intermediate output values obtained by inputting a different one of the possible cell images included in said at least a part of the training dataset;
- constructing (i.e. fitting) a latent variable model using the first sets of intermediate output values, the latent variable model providing a mapping of the first sets of intermediate output values to first sets of projected values in a sub-space of the latent variable model that has a dimension lower than a dimension of the sets of the intermediate outputs; and
- storing the latent variable model and the first sets of projected values in a storage medium.

According to another aspect (that may be combined with the first aspect), a computer-implemented method for analysis of cell images is provided. The method includes:
- receiving a new cell image (i.e. a new observation) to be input to a deep neural ne irk, the deep neural network having a plurality of hidden layers and being trained using a training data set that includes possible cell images that can be input to the deep neural network;
- obtaining a second set of intermediate output values that are output from at least one of the plurality of hidden layers of the deep neural network by inputting the received new cell image to the deep neural network;
- mapping, using a latent variable model stored in a storage medium, the second set of intermediate output values to a second set of projected values; and
- determining whether or not the received new cell image is an outlier with respect to the training dataset based on the latent variable model and the second set of projected values,
- wherein the latent variable model stored in the storage medium is constructed by:
  - obtaining first sets of intermediate output values that are output from said one of the plurality of hidden layers of the deep neural network, each of the first sets of intermediate output values obtained by inputting a different one of the possible cell images (i.e. possible observations) included in said at least a part of the training dataset; and
  - constructing/fitting the latent variable model using the first sets of intermediate output values, the latent variable model providing a mapping of the first sets of intermediate output values to first sets of projected values in a sub-space of the latent variable model that has a dimension lower than a dimension of the sets of the intermediate outputs.

According to yet another aspect, a computer-implemented method for analysis of cell images is provided. The method includes:
- obtaining a deep neural network and at least a part of a training dataset used for training the deep neural network, the deep neural network comprising a plurality of hidden layers and being trained by using the training dataset, the training dataset including a plurality of possible cell images (i.e. observations) that can be input to the deep neural network;
- obtaining first sets of intermediate output values that are output from at least one of the plurality of hidden layers, each of the first sets of intermediate output values obtained by inputting a different one of the possible cell images included in said at least a part of the training dataset;
- constructing (i.e. fitting) a latent variable model using the first sets of intermediate output values, the latent variable model providing a mapping of the first sets of intermediate output values to first sets of projected values in a sub-space of the latent variable model that has a dimension lower than a dimension of the sets of the intermediate outputs;
- receiving a new cell image to be input to the deep neural network;
- obtaining a second set of intermediate output values that are output from said at least one of the plurality of hidden layers of the deep neural network by inputting the received new cell image to the deep neural network;
- mapping, using the latent variable model, the second set of intermediate output values to a second set of projected values; and
- determining whether or not the received observation is an outlier with respect to the training dataset based on the latent variable model and the second set of projected values.

When the received observation is determined to be an outlier, it may be assumed that a prediction (e.g. an output) given by the deep neural network for the received observation is less reliable than in case the received observation is determined to be a non-outlier. Accordingly, the method according to any of the above aspects may further comprise:
- calculating, by the deep neural network, a prediction for the new cell image; and
- if the new cell image is determined to be outlier, discarding the prediction; and
- if the new cell image is determined not to be outlier, accepting the prediction.

In various embodiments and examples described herein, the data to be processed by the deep neural network is cell images, such as live or non-live cell images. Cell images are an example of unstructured data. Unstructured data may be understood as data that either does not have a pre-defined data model or is not organized in a pre-defined manner. Unstructured data may have internal structure but is not structured via pre-defined data models or schema. The cell images may be raw (unprocessed images) or may be images that have been subjected to some preprocessing, such as normalization, contrast enhancement, edge enhancement, noise removal, color conversion, resizing, cropping and/or other known image processing operations.

In the present disclosure, an image may include a 2D array of pixels. Each of the pixels may include at least one value. For example, a pixel in a greyscale image may include one value indicating an intensity of the pixel. A pixel in a color image may include multiple values, for example three values, that indicate coordinates in a color space such as RGB color space. A pixel may also include a combination of different imaging modalities, for instance an intensity value from phase contrast imaging and one or more intensity values from fluorescent imaging.

In the present disclosure, the term "deep neural network" may be understood as an artificial neural network having an input layer, an output layer and a plurality of hidden layers provided between the input layer and the output layer. A hidden layer of a neural network may also be referred to as an "intermediate layer". Thus, an output from the hidden layer may be referred to as an "intermediate output". Further, an output from the hidden layer may include a plurality of values, each of which corresponds to a node included in the hidden layer. Accordingly, the term "set of intermediate output values" as used herein may indicate an output of a hidden layer, including a plurality of values that are output from respective nodes of the hidden layer.

The type of the deep neural network employed is not particularly limited. In some examples, the "deep neural network" in the present disclosure may be a feedforward neural network having a plurality of hidden layers. In a feedforward neural network, connections between nodes do not form a cycle. A specific example of a feedforward deep neural network may be a convolutional neural network (CNN) that is commonly applied to analyzing visual imagery.

In some other examples, the "deep neural network" in the present disclosure may be a recurrent neural network where connections between nodes form a directed graph along a sequence. A specific example of a recurrent deep neural network may be Long-Short Term Memory (LSTM) which can process sequential data.

Other exemplary deep neural networks are transformer neural networks.

In the present disclosure, the term "latent variable model" may be a statistical model that relates or maps a set of observable variables to a set of latent variables. In various embodiments and examples described herein, the (first or second) "set of intermediate output values" may be considered as the set of observable variables for the latent variable model. Further, in various embodiments and examples described herein, the "set of projected values" may be considered as the set of latent variables for the latent variable model.

In some examples, in the method according to the above-stated aspects, the latent variable model may be constructed or fitted according to principal component analysis.

In the present disclosure, the term "principal component analysis", also referred to as PCA, may be understood as indicating a statistical procedure that uses an orthogonal transformation to convert a set of observations of possibly correlated variables into a set of values of linearly uncorrelated variables called principal components.

Variants of PCA include but are not limited to: sparse PCA (Jenatton, R., Obozinski, G., & Bach, F. (2010, March). Structured sparse principal component analysis. In *Proceedings of the Thirteenth International Conference on Artificial Intelligence and Statistics* (pp. 366-373)). Alternatives to PCA include but are not limited to; random projections (Dasgupta, S. (2000, June). Experiments with random projection. In *Proceedings of the Sixteenth Conference on Uncertainty in Artificial Intelligence* (pp. 143-151). Morgan Kaufmann Publishers Inc.); sparse random projections (Achlioptas, D. (2003). Database-friendly random projections: Johnson-Lindenstrauss with binary coins. *Journal of Computer and System Sciences,* 66(4), 671-687.); very sparse random projections (Li, P., Hastie, T. J., & Church, K. W. (2006, August). Very sparse random projections. In *Proceedings of the 12th ACM SIGKDD International Conference on Knowledge Discovery and Data Mining* (pp. 287-296). ACM); and self-organizing maps (Kohonen, T. (1998). The self-organizing map. *Neurocomputing,* 21(1-3), 1-6.)

In some other examples, in the method according to the above-stated aspects, the latent variable model may be constructed or fitted using an autoencoder. An "autoencoder" may be a type of artificial neural network used to learn efficient data codings in an unsupervised manner. One form of an autoencoder may be a feedforward, non-recurrent neural network having an input layer, an output layer and one or more hidden layers connecting them, with the output layer having the same number of nodes as the input layer, and with the purpose of reconstructing its own inputs. Different types of autoencoders include but are not limited to variational autoencoders (Kingma, D. P., & Welling, M. (2013). Auto-encoding variational bayes. arXiv preprint arXiv:1312.6114.); and sparse autoencoders (Makhzani, A., & Frey, B. (2013). K-sparse autoencoders. arXiv preprint arXiv:1312.5663.).

Using the latent variable model, a distance of the new cell image to the latent variable model, or in other words from the latent variable approximation, may be determined. Based on the determined distance, a determination as to whether or not the new cell image is an outlier may be made. The determining as to whether or not the received new cell image is an outlier may for example comprise determining whether the distance of the new cell image to the latent variable model is greater than a threshold distance. If the calculated distance of the new cell image is greater than the threshold distance it may be determined that the new cell image is an outlier.

The threshold distance may be determined by calculating, using the latent variable model, a distance of each of the cell images of the at least a part of the training dataset to the latent variable model and determining the threshold distance based on the determined distances. Accordingly, the method according to any of the above aspects may further comprise determining a threshold distance based on a plurality of distances, each of which being calculated for a different one of the first sets of projected values with respect to the distribution of the first sets of projected values.

Further, in the method according to the above-stated aspects, said step of determining whether or not the received new cell image is an outlier may comprise:

calculating a distance of the second set of projected values with respect to a distribution of the first sets of projected values; and determining that the received observation is an outlier with respect to the training dataset if the calculated distance is larger than a threshold value for the distance.

The threshold value for the distance may be determined based on distances, each of which may be calculated for a different one of the first sets of projected values with respect to the distribution of the first sets of projected values.

The distance metric may be any distance metric suitable to quantify the distance from the latent variable approximation (i.e. the first set of projected values). For example, the distance may be a residual sum of squares (RSS), Mahalanobis distance, Local Outlier Factor or LOF (see e.g., M. M. Breunig, H.-P. Kriegel, R. T. Ng, and J. Sander, "LOF: Identifying Density-based Local Outliers," in Proceedings of the 2000 ACM SIGMOD International Conference on Management of Data, New York, NY, USA, 2000, pp. 93-104). The distance may also be a compound distance based on compound distance metric to Modelled Embedding that is formed by combining two or more of the described distances.

The determined distance may be in particular a Mahalanobis distance. In the present disclosure, the term "Mahalanobis distance" may be understood as indicating a known measure of the distance between a point P (e.g., corresponding to an observation) and a distribution D. More specifically, the "Mahalanobis distance" measures how many standard deviations away an observation is from the origin in a multivariate probability distribution.

The determined distance may residual sum of squares (RSS). For example, in the method according to the above-stated aspects, said step of determining whether or not the received new cell image is an outlier may comprise:

determining an approximate set of intermediate output values corresponding to the second set of intermediate output values, using the latent variable model and the second set of projected values;

calculating a squared approximation residual for the second set of intermediate output values and the approximate set of intermediate output values; and determining that the received new cell image is an outlier with respect to the training dataset if the calculated squared approximation residual is larger than a threshold value for the squared approximation residual.

The threshold value for the squared approximation residual may be determined based on squared approximation residuals, each of which may be calculated for a different one of the first sets of intermediate output values and an approximate set of intermediate output values corresponding to said one of the first sets of intermediate output values.

In the present disclosure, the term "squared approximation residual" may be understood as indicating a sum of squares of residuals, where a residual is a difference between an observed value and an approximated value provided by the latent variable model.

Further, in the method according to the above-stated aspects, the steps of obtaining the first sets of intermediate output values and constructing the latent variable model may be performed for two or more of the plurality of hidden layers;

wherein the steps of obtaining the second set of intermediate output values and mapping the second set of intermediate output values to the second set of projected values may be performed concerning said two or more of the plurality of hidden layers; and wherein, the step of determining whether or not the received new cell image is an outlier may be performed based on the latent variable model and the second sets of projected values obtained concerning said two or more of the plurality of hidden layers.

Still further, in the method according to the above-stated aspects, the step of obtaining the intermediate output values that are output from at least one of the plurality of hidden layers of the deep neural network may comprise determining activations from the at least one of the plurality of hidden layers and optionally applying a global pooling on the determined activations. The activations may be for example in form of activation vectors.

An activation vector $a_i$ (or activation) of a particular cell image (observation) x from a layer i (i=1, 2, 3, ...) of a given deep neural network may correspond to the intermediate output from the layer i and may include components with values corresponding to outputs from respective nodes of the layer i when the cell image is input to the given network. Each of the activations or activation vectors on the various layers of the deep neural network may provide a feature representation of the input data (i.e. the input cell image). In other words, the activations may provide transformed, or pre-processed, representations of the input data at the various layers of the deep neural network.

In particular, the step of obtaining the first intermediate output values that are output from at least one of the plurality of hidden layers of the deep neural network based on the cell images of the training dataset may comprise determining activations of said images from the at least one of the plurality of hidden layers and optionally applying a global pooling on the determined activations. Similarly, the step of obtaining the second intermediate output values that are output from at least one of the plurality of hidden layers of the deep neural network based on the new cell image may comprise determining activations of the new cell image from the at least one of the plurality of hidden layers and optionally applying a global pooling on the determined activations. The global pooling may be global average pooling.

For example, if the activations are from feature maps, global pooling (e.g. global average pooling) may be applied across each feature map. The latent variable model may be subsequently constructed or fitted on the (optionally pooled) activations, i.e. on the (optionally pooled) training set activations and on the (optionally pooled) activations calculated for the new cell image input to the deep neural network.

Global Average Pooling (GAP) refers to the procedure of transforming the feature map representation of the network activations to a vector representation (see e.g. Lin, Min, Qiang Chen, and Shuicheng Yan. "Network in network." arXiv preprint arXiv:1312.4400 (2013)). This step discards spatial information resulting in a vector where each element corresponds to the average activation of a particular feature map. For a particular hidden layer in a convolutional neural network, the activation of an image x are described by features maps A that may have dimensions w×h×c, where h is the pixel height of the feature map, w is the pixel width of the feature map and c is the number of feature map in the current hidden layer. The global average pooling of feature map k∈[1,c] of A is then given by $GAP_k(A) = \sum_{i=0}^{w} \sum_{j=0}^{h} A_{j,i,k}$ or $GAP_k(A) \approx \sum_{i=0}^{w} \sum_{j=0}^{h} A_{j,i,k}$, for example $$GAP_k(A) = \frac{1}{w \cdot h} \sum_{i=0}^{w} \sum_{j=0}^{h} A_{j,i,k}$$

The vector of global average pooled feature maps A for image x is then given by:

$GAP(A) = [GAP_1(A), GAP_2(A), \ldots, GAP_c(A)]$

Further, the method according to any one of the above aspects may comprise training of the deep neural network or fine tuning a trained deep neural network using the training dataset.

How well the method according to the above-stated aspect can distinguish outliers and non-outliers may be evaluated using, for example, the Receiver-Operating Characteristic Area-Under-Curve (ROC-AUC) metric. For instance, when the Mahalanobis distance and/or the squared approximation residual and/or other distance metrics is/are calculated for determining whether or not the received observation is an outlier, the ROC curves may be calculated by comparing how well the Mahalanobis distances and/or the squared approximation residuals and/or the other distance metrics separate outliers from non-outliers. Other metrics which may be used to evaluate the method include but are not limited to: (1) precision, which is a fraction of observations identified as outliers by the system that actually are outliers; (2) recall, which is a fraction of all outliers that are successfully identified as outliers by the system; (3) F1-score, which is a harmonic mean of precision and recall; and (4) accuracy, which is a fraction of correct identifications by the system out of all identifications.

According to yet another aspect, a computer program product is provided. The computer program product comprises computer-readable instructions that, when loaded and run on a computer, cause the computer to perform the method according to any one of the above-stated aspects.

According to yet another aspect, a system for data analysis is provided. The system comprises:
  a storage medium storing a training dataset used for training a deep neural network, the deep neural network comprising a plurality of hidden layers, the training dataset including possible cell images (i.e. observations) that can be input to the deep neural network; and
  a processor configured to perform the method according to any one of the above-stated aspects and examples.
For example, the processor may be configured to
obtain the deep neural network trained using the training dataset;
obtain at least a part of the training dataset stored in the storage medium;
obtain first sets of intermediate output values that are output from at least one of the plurality of hidden layers, each of the first sets of intermediate output values obtained by inputting a different one of the possible observations included in said at least a part of the training dataset;
construct/fit a latent variable model using the first sets of intermediate output values, the latent variable model providing a mapping of the first sets of intermediate output values to first sets of projected values in a sub-space that has a dimension lower than a dimension of the sets of the intermediate outputs;
receive a new cell image (i.e. an observation) to be input to the deep neural network;
obtain a second set of intermediate output values that are output from said at least one of the plurality of hidden layers by inputting the received observation to the deep neural network;
map, using the latent variable model, the second set of intermediate output values to a second set of projected values; and
determine whether or not the received observation is an outlier with respect to the training dataset based on the latent variable model and the second set of projected values.

In the system according to the above-stated aspect, the latent variable model may be constructed according to principal component analysis or using an autoencoder.

In the system according to the above-stated aspect, for determining whether or not the received new cell image is an outlier, the processor may be further configured to:
  calculate a Mahalanobis distance of the second set of projected values with respect to a distribution of the first sets of projected values; and
  determine that the received new cell image is an outlier with respect to the training dataset if the calculated Mahalanobis distance is larger than a threshold value for the Mahalanobis distance.

Instead of or in addition to Mahalanobis distance other distance measures may be employed. For example, the distance may be a compound metric distance to Modelled Embedding, residual sum of squares, Local Outlier Factor or any other suitable distance measure.

For example, in the system according to the above-stated aspect, for determining whether or not the received new cell image is an outlier, the processor may be further configured to:
  determine an approximate set of intermediate output values corresponding to the second set of intermediate output values, using the latent variable model and the second set of projected values;
  calculate a squared approximation residual for the second set of intermediate output values and the approximate set of intermediate output values; and
  determine that the received observation is an outlier with respect to the training dataset if the calculated squared approximation residual is larger than a threshold value for the squared approximation residual.

In the system according to the above-stated aspect, the processor may be further configured to:
  perform the steps of obtaining the first sets of intermediate output values and constructing the latent variable model for two or more of the plurality of hidden layers;
  perform the steps of obtaining the second set of intermediate output values and mapping the second set of intermediate output values to the second set of projected values concerning said two or more of the plurality of hidden layers; and
  perform the step of determining whether or not the received observation is an outlier based on the latent variable model and the second sets of projected values obtained concerning said two or more of the plurality of hidden layers.

Further, in the system according to the above-stated aspect, the processor may be further configured to determine activations from the at least one of the plurality of hidden layers and optionally applying a global pooling on the determined activations.

The (optionally pooled) activations may thus constitute the first/second intermediate output values.

The system according to the above-stated aspect may further comprise a storage medium for storing parameters of the deep neural network (for example, weights, node connections, filters, etc.). The specific parameters stored generally depends on the type of the deep neural network employed. Further, the system may comprise a storage medium for storing the latent variable model, data obtained by using the latent variable model such as distances, threshold distance(s), and/or other data.

According to various aspects and examples stated above, it is possible to detect outliers after model training to a deep neural network. The outliers in input images with respect to the training dataset can be efficiently detected, as less assumptions of how the deep neural network is constructed may be necessary and sampling may not be required. Further, according to various aspects and examples stated above, an already learned data representation may be used for outlier detection. In contrast to separate outlier detection models, the same representation used for prediction can be used for detection of outliers.

Further advantages of the methods and the systems according to various aspects and examples stated above, may include:

They are architecture-agnostic, meaning that they can be used in any type of neural network model:

They are training-agnostic. The calculation involves a single pass through the training data after the neural network is trained, meaning that the interference with regular training procedures is minimal;

They are task-agnostic, meaning that no assumptions about the task at hand need to be made. The proposed approach can be applied various tasks, such as classification, segmentation, regression, reinforcement learning and so on.

They outperform state-of-the-art methods in outlier detection.

The areas of application of the method and the system according to various aspects and examples stated above include, but are not limited to, live cell imaging and non-live cell imaging, including not only any suitable type of biological imaging but also any type of modelling. Thus, the proposed techniques are "general purpose" techniques, in the sense of being applicable to any type of input. For example, the presented techniques may be used for processing cell images obtained by the following cell imaging techniques:

Cell imaging, in particular live cell imaging. There are many different cell imaging techniques, such as:

Bright-field microscopy, in which the specimen is illuminated from below using white light;

Phase contrast microscopy imaging. This is an optical microscopy technique that allows detailed vision of transparent specimen that is difficult to capture using bright-field microscopy. It is based on converting phase shifts in light to brightness change;

Fluorescence imaging. This technique involves staining cells with a fluorescent dye that binds to some part of interest of the cell. Example part is DNA, where the fluorescence aids in detecting nuclei. The stains are often used to localize where in the cells proteins of interest are localized. Fluorescence means that the dye emits light on a certain wavelength when illuminated with light of some certain wavelength;

Confocal imaging. This is an imaging technique using a focused laser beam which allows increased optical resolution with very limited depth of focus.

Electron microscopy imaging: Subcellular structures may be so small that the wavelengths of light become the limiting factor for imaging due to diffraction. Light imaging is limited down to resolution of about 200 nm. To capture smaller structures, beams of electrons can be used as a source of illumination since electrons can have wavelengths up to 100 000 times shorter than visible light. For cell imaging, cells may be immobilized (e.g. killed and fixated). There are different electron microscopy imaging techniques, such as:

Transmission Electron microscopy. In this technique, images of the specimen are captured by illuminate the specimen with a high voltage electron beam that passes through the specimen. This allows images of extremely high resolution (below 50 pm) but requires extremely thin slices of samples (about 100 nm); and Scanning Electron microscopy. In this technique, the specimen is probed with a beam of electrons. It allows accurate capture of 3D shape of the specimen but not as high resolution as transmission electron microscopy.

The above is a non-limiting list of possible cell imaging techniques. Other suitable cell imaging techniques can be used as well.

The techniques according to various aspects and examples stated above can be used, for example for processing corrupted or blurry mages. The corrupted images may be images, parts of which are corrupted due to an interruption of the writing process during image writing or instrument malfunction. The blurry images may be for instance images in which movement blur is introduced due to a physical shift of the image capturing device and/or the imaged object(s) during image capture or images in which an out-of-focus blur is introduced since the object to be imaged is not in the optical focus.

The subject matter described in the application can be implemented as a method or as a system, possibly in the form of one or more computer program products. The subject matter described in the application can be implemented in a data signal or on a machine readable medium, where the medium is embodied in one or more information carriers, such as a CD-ROM, a DVD-ROM, a semiconductor memory, or a hard disk. Such computer program products may cause a data processing apparatus to perform one or more operations described in the application.

In addition, subject matter described in the application can also be implemented as a system including a processor, and a memory coupled to the processor. The memory may encode one or more programs to cause the processor to perform one or more of the methods described in the application. In some examples, the system may be a general purpose computer system. In other examples, the system may be a special purpose computer system including an embedded system.

BRIEF DESCRIPTION OF THE D WINGS

Details of one or more implementations are set forth in the exemplary drawings and description below. Other features will be apparent from the description, the drawings, and from the claims. It should be understood, however, that even though embodiments are separately described, single features of different embodiments may be combined to further embodiments.

DETAILED DESCRIPTION OF EMBODIMENTS

In the following text, a detailed description of examples will be given with reference to the drawings. It should be understood that various modifications to the examples may be made. In particular, one or more elements of one example may be combined and used in other examples to form new examples.

System Configuration

Figure 1:
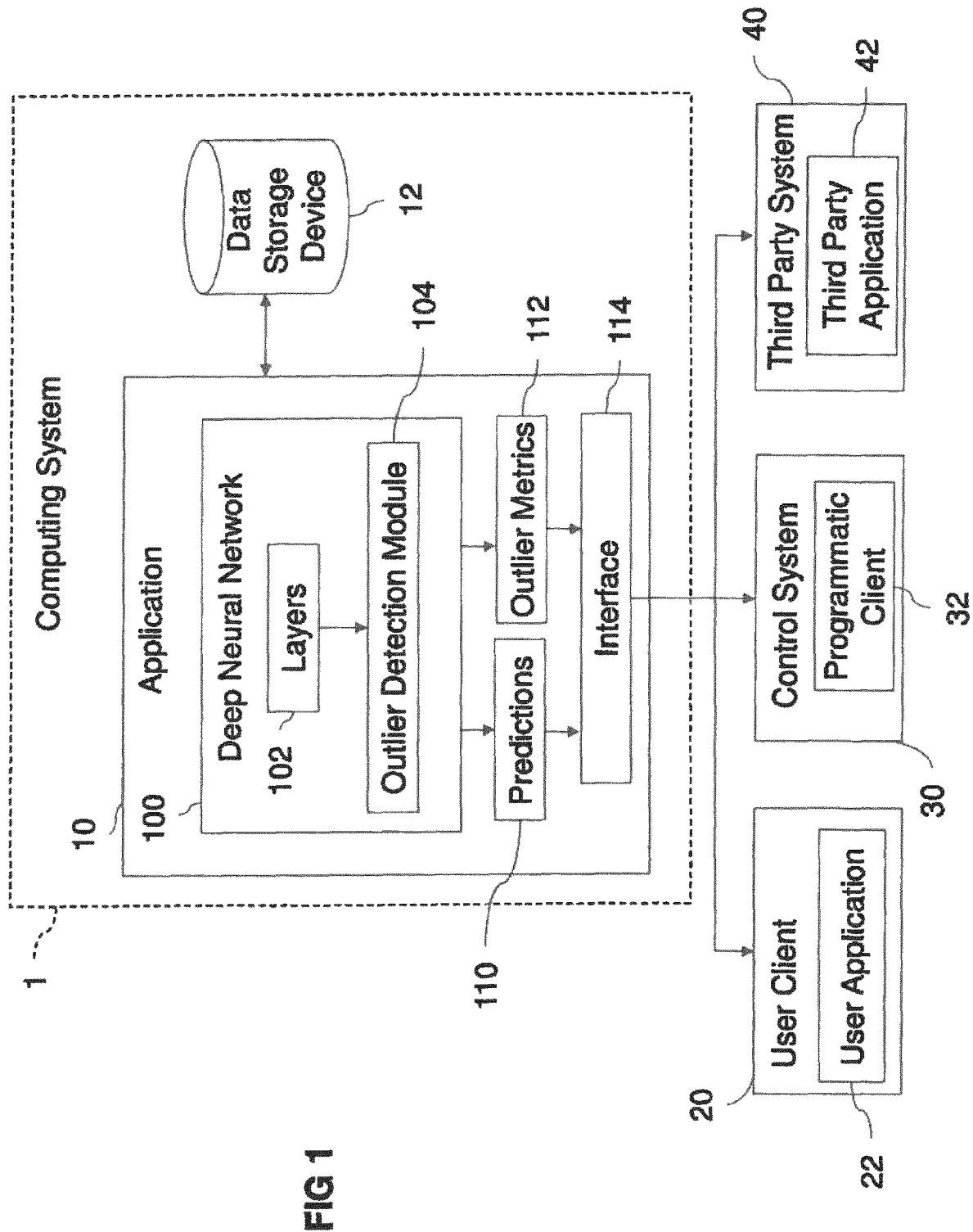
FIG. 1 shows an example of a system including the system according to the present disclosure.

FIG. 1 shows an example of a system including the system according to the present disclosure.

The system shown in FIG. 1 may comprise a computing system 1, a user client 20, a control system 30 and a third party system 40.

The computing system 1 may provide the system for data analysis, according to the present disclosure. The computing system 1 may be implemented using one or more general purpose computers, for example. As shown in FIG. 1, the computing system 1 may comprise an application 10 and a data storage device 12.

The application 10 may be implemented by a software application including instructions that cause a computer to perform exemplary processes of the computing system as will be described later in more detail. As shown in FIG. 1, the application 10 may comprise a deep neural network 100, predictions 110, outlier metrics 112 and an interface 114.

The deep neural network (hereinafter, also referred to as "DNN") 100 may be an artificial neural network having an input layer, an output layer and a plurality of hidden layers in between the input and output layers. The deep neural network 100 may be trained for processing images, using a training dataset including possible input cell images to the deep neural network 100. The training dataset may be stored in the data storage device 12 accessible by the application 10. In the example of FIG. 1, the deep neural network 100 may include layers 102 and an outlier detection module 104.

The layers 102 may include an input layer (not shown), an output layer (not shown) and a plurality of hidden layers (not shown) provided between the input layer and the output layer.

The outlier detection module 104 may be connected to at least one of the plurality of hidden layers of the deep neural network 100 and be configured to determine whether or not an observation (i.e. a cell image) is an outlier with respect to the training dataset used for training the deep neural network 100. The details of the process performed by the outlier detection module 104 will be described later.

Figure 2:
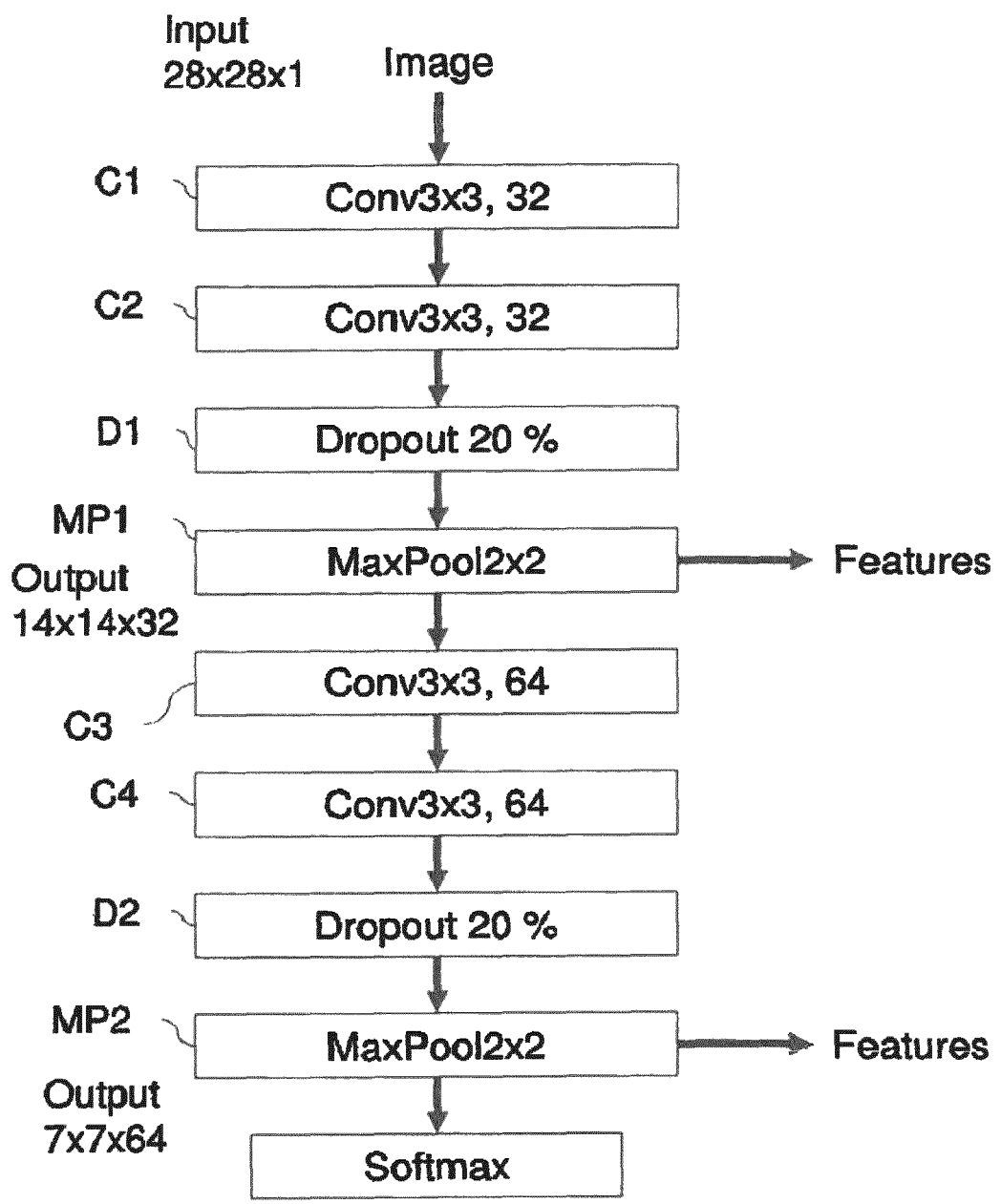
FIG. 2 shows an exemplary configuration of a convolutional neural network (CNN) for processing images.

FIG. 2 shows a specific example of the deep neural network 100. The exemplary deep neural network shown in FIG. 2 is a convolutional neural network (CNN) for classifying images. For example, the exemplary CNN shown in FIG. 2 may classify input images such as cell images into a number of different categories. In another example, the exemplary CNN shown in FIG. 2 may determine whether or not an input image belongs to a particular category. In any case, the exemplary CNN shown in FIG. 2 may be configured to receive a greyscale image of 28×28 pixels as an input image. Each pixel of the input image may include a value indicating an intensity of the pixel. The intensity value of each pixel of the input image may be considered as an input value to an input node of an input layer of the exemplary CNN. The exemplary CNN shown in FIG. 2 comprises four convolutional layers C1, C2, C3, C4, two max pool layers MP1, MP2 and an output layer with a softmax function as the activation function of nodes included in the output layer.

While the above example uses a 28×28 pixel image, from a theoretical perspective, there is no upper limit on the size of the image. However, increasing the image size may also increase computational demands. In general, the image size selected for the application of interest may reflect a trade-off between a desired level of detail and computational demands. In typical classification applications, images may range from 200×200 pixels to 300×300 pixels. However, applications are not limited to this range, and may be smaller than 200×200 pixels or greater than 300×300 pixels.

Each node included in the convolutional layer C1 of the exemplary CNN may correspond to a filter of size 3×3 (pixels), applied to a particular part of the input image and may output a value resulting from applying the filter to the particular part of the input image. In the example of FIG. 2, 32 filters are applied to the input image at the convolutional layer C1. Each of the 32 filters may be applied to the whole area of the input image by sliding the filter with a stride of S pixel(s) in both width and height directions of the input image. For each location of the 32 filters on the input image, 32 nodes corresponding to the 32 filters may be present in the convolutional layer C1. In the example of FIG. 2, the stride S may be set to 1 pixel. The output of the convolutional layer C1 may thus include 28×28×32 values, which may be considered as 32 images of 28×28 pixels. The output of the convolutional layer C1 may be input to the convolutional layer C2. The convolutional layer C2 may have a configuration analogous to the convolutional layer C1 with 32 filters of size 3×3. Accordingly, the output of the convolutional layer C2 may also include 28×28×32 values, which may be considered as 32 images of 28×28 pixels.

The output of the convolutional layer C2 may be subject to 20% of dropout (see D1 of FIG. 2). In other words, 20% of the values (corresponding to nodes) in the output of the convolutional layer C2 may be randomly selected and disregarded.

After the dropout operation D1, the output of the convolutional layer C2 may be further subject to down-sampling by a max-pooling operation at the first max pool layer MP1. The max pooling operation may select the maximum value among a plurality of input values. In the example of FIG. 2, the max pool layer MP1 may apply filters having a size of 2×2 may be applied, with a stride of 2 pixels, to each of the 32 images with 28×28 pixels output from the convolutional layer C2. This may result in 32 output images including 14×14 pixels each of which has the maximum intensity value among the pixels of the corresponding image (output from the convolutional layer C2) within the corresponding filter. Each filter used in the max pooling operation may be considered as a node of the max pool layer MP1.

The output from the max pool layer MP1 may be provided to the convolutional layer C3, having a configuration analogous to that of the convolutional layers C1, C2, but applying 64 filters. The output of the convolutional layer C3 may be provided to the convolutional layer C4, having an analogous configuration as the convolutional layer C3, with 64 filters of size 3×3. Further, the output of the convolutional layer C4 may be subject to 20% of dropout (see D2 of FIG. 2) and then subject to the max-pooling operation at the max pool layer MP2 in a manner analogous to that at the max pool layer MP1 as stated above. The output of the max pool layer MP2 may include 7×7×64 values.

Finally, the output of the max pool layer MP2 may be provided to the output layer with a softmax function. The output layer may include one or more output nodes corresponding to one or more groups (or categories) into which the input image may be classified. While this example refers to specific parameters (e.g., a number of filters, a dropout percentage, number of convolutional layers, stride, etc.), the methods and systems are not limited to these embodiments, as a range of values for each parameter is contemplated herein.

In some examples, concerning the exemplary CNN shown in FIG. 2, the outputs from the max pool layers MP1 and MP2 may be provided to the outlier detection module 104 (FIG. 1) for detecting whether or not the input image is an outlier with respect to the training dataset used for training the exemplary CNN shown in FIG. 2. For instance, the outlier detection module 104 may construct or fit, for each of the max pool layers MP1 and MP2, a latent variable model using the outputs from the respective max pool layers MP1 and MP2 for possible input images in the training dataset. The latent variable model may provide a mapping of the outputs of the max pool layer MP1 or MP2 to sets of projected values in a sub-space (latent variable model sub-space) that has a dimension lower than a dimension of the outputs of the max pool layer MP1 or MP2. The constructed or fitted latent variable model may be used for determining whether or not an input image (e.g., a newly obtained input cell image that is not included in the training dataset) is an outlier with respect to the training dataset. In more general terms, the outlier detection module 104 may be configured to obtain outputs from one (or more) of the hidden layers of the deep neural network 100 and construct or fit the latent variable model using the obtained outputs. The details of the constructing or fitting a latent variable model will be described later below.

Referring again to FIG. 1, the predictions 110 may be outputs from the deep neural network 100. In some examples, the predictions 110 may indicate which category the input image is classified into by the deep neural network 100.

The outlier metrics 112 may include metrics for determining whether an input image is an outlier with respect to the training dataset used for training the deep neural network 100. The details of the outlier metrics 112 will be described later below.

The interface 114 may be an interface for the application 10 to communicate with various devices that may be provided outside the computing system 1. For example, the interface 114 may be configured to communicate information generated by the application 10 to those devices. Further, for example, the interface 114 may be configured to receive information directed to the application 10 from those devices.

The data storage device 12 may be configured to store data that is used by the application 100. Although FIG. 1 shows the data storage device 12 to be a part of the computing system 1, in some examples, the data storage device 12 may be provided outside the computing system, as long as the data stored in the data storage device 12 is accessible by the application 10.

The user client 20 may be a client device connected to the computing system 1. The user client 20 may include a user application 22 that may use the predictions and the results of outlier detection performed at the computing system 1. A specific example of the user client 20 may be a work-station remotely connected to a computational server, for instance using SSH (Secure Shell) or HTTP (Hypertext Transfer Protocol) requests. The DNN (deep neural network) can then be applied to user-provided input on the computational server and the resulting predictions and outlier metrics can be returned to the user client 20. The user client 20 may be part of the same physical device as the computing system 1 running the application 10, for instance on a work-station configured to perform DNN predictions.

The control and/or analysis system 30 may control a device and/or perform further data analysis using the predictions and the results of outlier detection performed at the computing system 1. An example of the control and/or analysis system 30 may be a control and/or analysis system for a biopharmaceutical manufacturing process, for example for monoclonal assurance in first steps of production of monoclonal antibodies. Another example may be a control and/or analysis system for diagnostic purposes. The control and/or analysis system 30 may comprise a programmatic client 32 running in the control and/or analysis system 30 receiving input and making decisions to how to control a processing device and/or performing data analysis. A specific example of the present techniques relates to characterization of input material to the control system of a biopharmaceutical manufacturing process. To ensure desired output quality of such manufacturing processes, control parameters of the process may be adjusted according to properties of the input material. A heterogeneous combination of data sources may be used to characterize the input material including both structured and unstructured data such as cell images. Example data sources may include text, such as event reports, images, chromatograms, spectroscopic data, chemical analysis, etc. Deep learning is well suited to analyze such heterogeneous combination of data due to deep learning's ability to find useful mappings from both structured and unstructured data to a given output. To avoid poor output quality or catastrophic failure when input data does not match the data used to train the deep learning model, it may be important to detect outliers after model training. If input data are identified as an outlier, the input data may not be used as input to the manufacturing process since the output quality cannot be guaranteed.

Another specific example of the present techniques is in control systems learned from data using deep reinforcement learning, rather than programmed by a human controller. In a biopharmaceutical manufacturing process, there may be a large number of possible control parameters and it may be challenging to find all interactions and feedback loops existing in the system due to high complexity. Instead deep reinforcement learning may be used to learn control policies from data and simulation. To detect when the process enters a state that is different from states encountered during model training, outlier detection may be important. If such state is identified as an outlier, the deep learning based control system may warn the user (e.g., by sending a notification to the user) and/or may perform safety routines to avoid poor output quality or catastrophic failure. Examples of the use of deep reinforcement learning may be found in the art (e.g., Li, Y., Wen, Y., Guan, K., & Tao, D. (2017). Transforming Cooling Optimization for Green Data Center via Deep Reinforcement Learning. arXiv preprint arXiv:1709.05077; and Nguyen, P. & Takashi, E. (2018). Automating Water Purification Plant Operations Using Deep Deterministic Policy Gradient. In *Proceedings of Workshop* (Published at ICML Workshop for Deep Learning for Safety-Critical in Engineering Systems)).

Unlike prior art methods for outlier detection in deep learning models, the present methods do not constrain how the model is designed and/or trained, allowing these methods to be added to models in production. Additionally, as the present techniques are used after model training, the present techniques may be used with real-time applications and/or models implemented in a live application. In contrast, prior art methods that use multiple forward-passes/inferences per prediction (e.g., wherein the prediction is used as the average and the standard deviation or entropy is used as the uncertainty measure), may lead to increases in latency, which is problematic for real-time applications. Further, the proposed techniques are architecture agnostic, training agnostic and task agnostic.

The third party system 40 may be implemented by a computer and may include a third party application 42. The third party system 40 may belong to an entity that is different from an entity to which the computing system 1 belongs to. The third party application 42 may use the predictions and the results of outlier detection performed at the computing system 1. A specific example of the third party application 42 may be a software relying on DNN predictions and results of outlier detection purchased from a DNN prediction provider.

The computing system 1 may be connected with the user client 20, the control system 30 and the third party system 40 via a network such as the Internet. In some examples, one or more of the user client 20, the control system 30 and the third party system 40 may be connected to the computing system 1 via an intranet.

Prediction-Time Outlier Detection Using Partial Least Squares Regression

As mentioned above, the outlier detection module 104 in the computing system 1 shown in FIG. 1 may be configured to construct or fit a latent variable model using intermediate output values that are output from at least one of the plurality of hidden layers of the deep neural network 100 (e.g., the max pool layer MP1 or MP2 of FIG. 2), in order to determine whether or not an input image is an outlier with respect to the training dataset used for training the deep neural network 100. The intermediate output values may for example be activations of the respective input images from the at least one of plurality of hidden layers of the deep neural network 100. Optionally, if activations are from feature maps, a global pooling (e.g. a global average pooling) may be applied across each feature map.

The following provides an exemplary technique for outlier detection using partial least squares regression, which may facilitate understanding of how the outlier detection module 104 can detect outliers.

The concept of model uncertainty is related to that of prediction time outlier detection. In both cases, the main objective may be to find observations (e.g. cell images) that do not correspond to observations with which the model has been trained (e.g. cell images comprised in the training dataset). Predictive models have long been used to detect out-of-distribution observations during prediction in manufacturing process monitoring. In this field, linear latent variable models such as partial least squares (PLS) regression are widely used (see e.g., P. Geladi and B. R. Kowalski, "Partial least-squares regression: a tutorial," Anal. Chim. Acta, vol. 185, no. Supplement C, pp. 1-17, January 1986). A PLS model can find a sub-space approximating the training data similar to Principal Component Analysis (PCA) (S. Wald, K. Esbensen, and P. Geladi, "Principal component analysis," Chemom. Intell. Lab. Syst., vol. 2, no. 1, pp. 37-52, August 1987), which is used for predictions. New observations may then be projected onto the sub-space found by the PLS model. Accordingly, both distance within the sub-space and distance from the sub-space can be used to find outliers during prediction-time.

Prediction time refers to the time after the model has been fitted and the model is used for prediction in an application (and does not include time for model fitting/training, when the model is generated).

It is noted that, although simple and effective, the principles for the PLS model as mentioned above may not be directly applied to a deep learning system. Specifically, the basis for prediction of PLS is a sub-space of the input data space, making it straight forward to compare the sub-space approximation of new observations to those used for training. Deep learning models, on the other hand, typically depend on multiple layers of non-linear transformations, where each transformation contributes to the final output. This may mean that seemingly different observations are transformed through a sequence of spaces and mapped to an output. This ability to find useful transformation of input to output may be the reason why deep learning models work well for unstructured data. However, a consequence of these transformations may be that the transformations make it difficult to determine whether or not new observations belong to the same data distribution that the model was trained on. There may be no obvious point of comparison to determine the limits of the deep learning model's knowledge and no obvious way to decide if a new observation is within those limits.

PLS regression is a widely used regression model within, for example, manufacturing process monitoring. Given a training data matrix with n rows of observations and p columns of features, denoted $X=[x_1 \ldots x_n]^T$, with corresponding target matrix with q columns of responses, denoted Y, a PLS model may summarize both data-matrices. Similar to PCA, PLS may find full-rank sub-spaces, of equal dimension k, called "latent variable spaces" that approximate X and Y. In contrast to PCA, the PLS may maximize the covariance between the sub-spaces found, instead of maximizing the variance of a single sub-space. In short, PLS may approximates the input data as:

$$X=TP^T+E \qquad (1)$$

Where $T=[t_1, \ldots, t_k]$ may be an n×k latent variable matrix spanning a full-rank sub-space of the column-space of X and maximizing the covariance with Y, P may be p×k matrix of PLS loadings, and E may be an n×p matrix of approximation residuals. The loadings may contain the linear combination weights used to approximate X from T. The response matrix for Y may be approximated in a similar way. More details on how to calculate the PLS model and use it for regression can be found in S. Wold, M. Sjöström, and L. Eriksson, "PLS-regression: a basic tool of chemometrics," Chemom. Intell. Lab. Syst., vol. 58, no. 2, pp. 109-130, October 2001.

The approximation of the input data provided by PLS can be used to detect outliers encountered during prediction. After model fitting, new observations may be projected onto the sub-space found using PLS by:

$$T_{new}=X_{new}P \qquad (2),$$

which may allow approximation of the new observations as:

$$X_{new} \approx \hat{X} = T_{new}P^T \qquad (3).$$

Both the sub-space projection, $T_{new}$, and the approximation may be used to detect outliers based on a suitable distance metric. Two exemplary measures used to detect outliers during prediction-time are Mahalanobis distance in the latent variable space and approximation residuals in the input column space. Other measures may be compound metric Distance to Modelled Embedding, Local Outliner Factor (LOF), etc.

One way to detect outliers during prediction-time when using PLS may be to use Mahalanobis distance. The Mahalanobis distance is a known statistical distance measuring how many standard deviations away an observation is from the origin in a multivariate probability distribution. The intuition may be that observations with large Mahalanobis distances are unlikely under the given probability distribution. A latent variable probability distribution may be parametrized using a covariance matrix, $C_T$, of the latent variables in T, assuming that the latent variables have zero mean. Then the Mahalanobis distance $d_i$ of an observation $x_i$ with projection $t_i$ in latent variable space may be calculated as:

$$d_i = \sqrt{t_i^T C_T^{-1} t_i} \qquad (4)$$

While the Mahalanobis distance can measure how unlikely an observation is under the given distribution, the Mahalanobis distance may provide no information whether or not the observation belongs to that distribution. In contrast, the approximation residuals can provide a simple measure of how far from the distribution a new observation is. Given a fitted PLS model, an observation $x_i$ may be approximated as $\hat{x}_i$. The squared approximation residual may then be simply given by:

$$RSS = \Sigma_{j=1}^p (x_{i,j} - \hat{x}_{i,j})^2 \qquad (5)$$

where $x_{i,j}$ may be the j-th element of the observation vector. The intuition may be that the approximation of observations from another distribution than the training distribution will fail resulting in large approximation residuals.

Prediction-Time Outlier Detection for Deep Neural Networks

The outlier detection module 104 may perform an add-on method based on the principles for prediction time outliers in, e.g. manufacturing process monitoring, as stated above, for finding observations that the deep neural ne irk 100 may not be able to explain. The deep neural network 100 may be any type of neural ne irk, for example convolutional neural network (CNN), recurrent neural network, recursive neural network, transformer neural network, etc.

The method performed by the outlier detection module 104 to detect prediction-time outliers in a deep learning system may be based on the fact that a neural network may function by transforming input data. When input data is fed through a deep neural network, multiple intermediate representations of the data may exist, where the intermediate representations may be used for prediction (e.g., of a group into which the input data is classified in case of the deep neural network is configured to solve a classification problem). One or more of these intermediate representations may be used for detecting outliers during prediction, as well as for performing the prediction.

In order to provide a possibility to detect outliers during prediction in a similar way as PLS, a deep neural network (e.g. a feed-forward neural network) may be considered as a series of non-linear transformations. In other words, an activation vector $a_t$ of an observation x (input data such as an input cell image) from layer t (=1, 2, 3, 4, . . . ) of the given network may be given by the nested series of transformations as follows:

$$a_i = f_i(W_i f_{i-1}(W_{i-1} f_{i-2}( \ldots f_1(W_1 x)))) \qquad (6)$$

where $f_k$ (k=1, 2, . . . , i) may be activation functions and $W_k$ (k=1, 2, . . . , i) may be weight matrices. The activation vector $a_i$ of the observation x may be considered as an intermediate output from the layer i of the given network and may include element values corresponding to outputs from respective nodes of the layer i when the observation x is input to the given network. Each of these activations $a_k$ may provide a feature representation of the input data. Although the weight matrices may be commonly obtained by supervised training by means of back-propagation, the activations may simply provide transformed, or pre-processed, representations of the input data.

To explain the transformation in more detail, observation x may be an n-dimensional row vector $x=[x_1 \ x_2 \ \ldots \ x_n]$ wherein n depends on the application. In the case of x which is a single channel image, n may be the image's length in pixels multiplied with the image's width in pixels and the values $x_1, x_2, \ldots, x_n$ are the pixel values of the image. In the first layer, x is matrix multiplied with the first weight matrix $W_1$ to form the linear projection $\hat{x}$ which is $n_1$-dimensional. The dimension of $W_1$ is $n \times n_1$. After linear projection, an activation function $f_1$ is applied to $\hat{x}$ to form activation $a_1$. The activation function $f_1$ may be a non-linear function. Common choices of activation functions include the rectified linear function $f(x)=\max(0,x)$, the sigmoid function $f(x)=(1+e^{-x})^{-1}$, the softmax function $f(x)_j = e^{x_j}/\Sigma_{m=1}^n e^{x_m}$, among others. Then, the activation $a_1$ is matrix multiplied with the weight matrix $W_2$ and the resulting linear projection $\hat{a}_1$ is transformed using an activation function. The procedure of matrix multiplication with weight matrices and transformation using activation functions is repeated i times until activation $a_i$ of layer i is obtained.

Using these intermediate representations, a plug-and-play method for detecting outliers in any deep neural network, e.g. any feed-forward neural network, may be provided. Given a trained network, the training data can be represented using the activation matrix $A_i = [a_{1,i} \ \ldots \ a_{n,i}]^T$ from layer i, where n may be the number of observations. Since $A_i$ may not be full-rank, it may be desirable to find a full-rank sub-space that can be used to approximate $A_i$. In some examples, PCA may be used to obtain the sub-space using linear projections, for mapping the data to a low-dimensional sub-space. In some other examples, other methods such as autoencoders, random projections, sparse principal components analysis, and/or self-organizing maps may be used for mapping the data to a low-dimensional sub-space.

In the examples of using PCA, the dimensionality of the training data activations can be reduced to m dimensions to obtain:

$$T_A, P_A = PCA(A_i) \qquad (7)$$

Similar to PLS, $T_A$ may denote the latent-variable matrix spanning a sub-space of the training set activations and $P_A$ may denote the PCA loadings. For example, PCA in matrix form may provide the following least squares model:

$$A_i = T_A P_A^T + E \qquad (8)$$

which may be considered analogous to equation (1) as stated above.

In the same manner as PLS, the covariance matrix of the latent variables and loading matrices may be used to detect prediction-time outliers based on a suitable distance metric, such as based on Mahalanobis distance, approximation residual, compound metric Distance to Modelled Embedding, Local Outliner Factor (LOF), etc.

When new observations (e.g. new cell images) are predicted using the trained neural network, the activations $A_{i,new}$ may also be extracted. The new activations may be projected to the sub-space found from the training data activations in the same way as when using PLS:

$$T_{A,new} = A_{i,new} P_A \quad (9)$$

And the distances, for example Mahalobis distances, of the new observations may be calculated according to the equation (4).

The new activations may also be approximated using the PCA loadings as:

$$A_{i,new} \approx \hat{A}_{i,new} = T_{A,new} P_A^T \quad (10)$$

The approximation residual calculated according to the following equation (11) (analogous to equation (5)) may also be used to detect outliers in the same way as when using PLS:

$$RSS = \Sigma_{j=1}^{p}(a_{i,j} - \hat{a}_{i,j})^2 \quad (11)$$

where p may indicate the number of nodes in layer i.

The determined distance may also be a compound distance metric, that is formed by combining two or more of the described distances. One example is to combine the Mahalanobis distance and residual distance, given by the square root of the residual sum of squares, using the Euclidean norm as:

$$d_{combined} = \sqrt{d_{Mahalanobis}^2 + d_{residual}^2} \quad (12)$$

The above is only one example of a compound distance metric, many other combinations are also possible.

The above equations, namely equations (7) to (12), have been adapted in a novel manner as provided herein to apply activations from deep neural networks.

Process for System Setup

Figure 3:
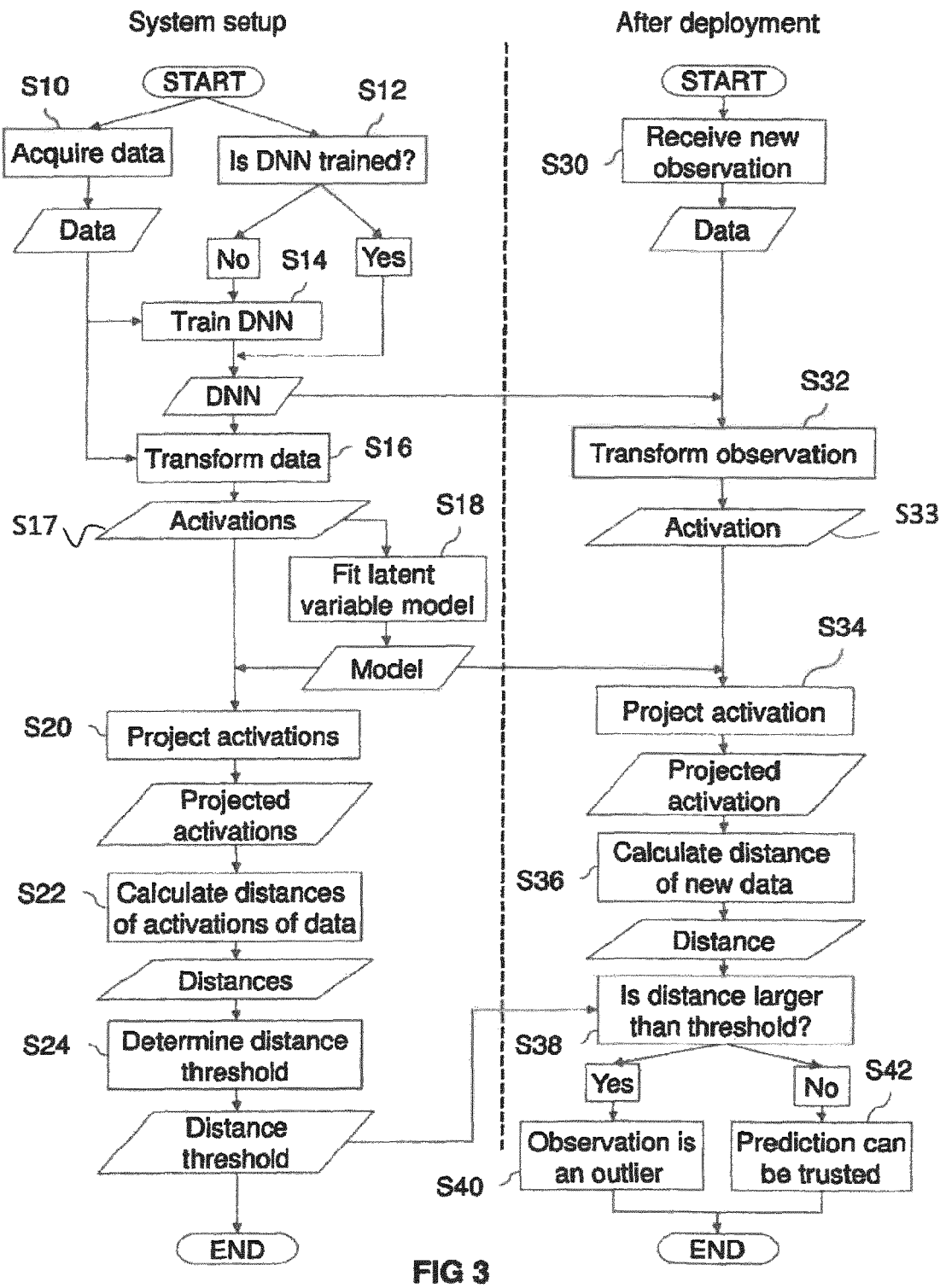
FIG. 3 shows a flowchart of exemplary processes performed by the system according to the present disclosure.

The left hand part of FIG. 3 shows a flowchart of an exemplary process for setting up the computing system 1. The exemplary process shown in FIG. 3 may be performed by the application 10 of the computing system 1.

At step S10, the application 10 may acquire data from the data storage device 12. The data may be at least a part of a training dataset for training the deep neural network 100. The training dataset may include possible observations input to the deep neural network 100. The training dataset may particularly include possible cell images as the possible observations, for example live cell images. The cell images may for example be microscopic cell images. In case the deep neural network 100 is a CNN as shown in FIG. 2, for example, the training dataset may include possible input images to the CNN as the possible observations.

At step S12, the application 10 may determine whether or not the deep neural network 100 has already been trained. Step S12 may be performed before, after, or in parallel with step S10.

If it is determined that the deep neural network 100 has not yet been trained (No at step S12), the process may proceed to step S14. If it is determined that the deep neural network 100 has already been trained (Yes at step S12), the process may proceed to step S16. Alternatively, before proceeding to step S16, the deep neural network 100 may be fine-tuned.

At step S14, the application 10 may train the deep neural network 100 using the data acquired at step S10.

At step S16, the application 10 may transform data using the deep neural network 100. At step S17 the application 10 may obtain intermediate output values that are output from at least one of the plurality of hidden layers of the deep neural network 100 (first sets of intermediate output values). Specifically, for example, the application 10 may obtain the activation vectors from at least one layer of the deep neural network 100 according to equation (6) stated above, of the possible input images in the training dataset. An activation refers to the result of a sequence of matrix multiplications and transformation using an activation function by an observation as described by equation (6). Optionally, if the activations are from feature maps, global pooling across each feature map may be applied, for instance average pooling.

At step S18, the application 10 may fit a latent variable model on the intermediate output values, for example on (optionally pooled) training set activations. In other words, the application 10 may construct the latent variable model. For example, the application 10 may obtain the latent-variable matrix $T_A$ and the PCA loadings $P_A$ using PCA as stated above (see e.g., equations (7) and (8)). Alternatively, the application may train an autoencoder using the (optionally pooled) activation vectors as inputs.

At step S20, the application 10 may project activations using the latent variable model. For example, the application 10 may obtain, from the activation vectors obtained at step S17, corresponding sets of projected values (e.g., T) in the sub-space found by constructing/fitting the latent variable model.

At step S22, the application 10 may use the latent variable model to calculate one or more set of distances of the training set images. For example, the application may calculate distances of activations of data. Any suitable distance metric may be used. For example, the application 10 may calculate the Mahalanobis distance for each of the activation vectors obtained at step S17, with respect to the latent variable model constructed at step S18, according to equation (4) stated above. Additionally or alternatively, for example, the application 10 may calculate the squared approximation residual for each of the activation vectors obtained at step S17 according to equation (11) stated above.

At step S24, the application 10 may determine a threshold value for the distance. Additionally or alternatively, a threshold value for the squared approximation residual may be determined. The threshold value(s) may later be used for determining whether a new observation (e.g. input image) is an outlier with respect to the training dataset. For obtaining the threshold value(s), the distances and/or the squared approximation residuals calculated at step S22 may be used. For instance, the threshold value may be a percentile, e.g. the $95^{th}$ percentile, of the distances (or the squared approximation residuals) calculated at step S22. It is noted that the "$95^{th}$ percentile" is merely an example and a value greater or lower than 95 may also be used as the percentile to determine the threshold.

The process for system setup may end after step S24.

Process for Outlier Detection

The right hand side of FIG. 3 shows an exemplary process performed by the computing system 1 for detecting outliers.

The process may begin by deploying the deep neural network. For example, the deep neural network may be incorporated in the software used to process the cell images. This may be within the imaging device itself, or as a standalone software module for analysis.

At step S30, the application 10 may receive a new observation (a new cell image). For example, in case the deep neural network 100 is a CNN as shown in FIG. 2, an image to be input to the CNN may be received as the new observation.

At step S32, the application 10 may transform the new observation using the deep neural network. The transforming may include for example calculating the deep neural network predictions for the new cell image.

Subsequently, the application may determine whether the new cell image is an outlier. This may be performed in the following manner:

At step S33 the application 10 may obtain intermediate output values that are output from at least one of the plurality of hidden layers of the deep neural network 100 (second set of intermediate output values). For example, the application 10 may obtain the activation vector from at least one layer of the deep neural network 100 according to equation (6) stated above, of the new observation.

At step S34, the application 10 may project the determined intermediate values (second set of intermediate values), using the latent variable model constructed/fitted at step S18 as stated above. For example, the application 10 may obtain, from the activation vector obtained at step S32, a corresponding set of projected values (e.g., $T_{A,new}$) in the sub-space found by constructing/fitting the latent variable model (see equation (9)).

At step S36, the application 10 may calculate a distance of the new observation using the latent variable model of step S18 as stated above. For example, the application 10 may calculate the Mahalanobis distance for the activation vector of the new observation obtained at step S32, with respect to the latent variable model constructed at step S18, according to equation (4) stated above. Additionally or alternatively, for example, the application 10 may calculate the squared approximation residual for the activation vector of the new observation obtained at step S32 according to equation (11) stated above. Other suitable distance metrics may be used instead of Mahalanobis distance and squared approximation residual.

At step S38, the application 10 may determine whether or not the distance calculated at step S36 is larger than the threshold determined at step S24.

If yes at step S38, the process may proceed to step S40 and the application 10 may determine that the new observation is an outlier. In this case, the system may report the model prediction as an unreliable prediction, since the new observation is determined to be an outlier. The process may end after step S40. Alternatively, other application specific actions may be taken. For example, the deep neural network's prediction may be ignored and the outlier image discarded.

If no at step S38, the process may proceed to step S42 and the application 10 may determine that the prediction made by the deep neural network 100 for the new observation can be trusted. In this case, the system may report the model prediction as a reliable prediction, since the new observation is determined to be a non-outlier. The process may end after step S42. Alternatively, the new cell image may be further processed.

EXPERIMENTS

In this section, results of experiments for outlier detection performed by the exemplary computing system 1 will be described. In the following experiments, the deep neural network 100 are directed to solve image classification or image segmentation tasks.

Example 1: Protein Localization in Fluorescent Confocal Imaging

An example of the above described approaches for outlier detection relates to localizing protein localization in fluorescently marked confocal microscopy image. The images are analyzed using the approach described in Kraus et al., "Automated analysis of high-content microscopy data with deep learning", *Molecular systems biology*, vol. 13, no. 4, p. 924, 2017. In this example, data provided by Chong et al., "Yeast proteome dynamics from single cell imaging and automated analysis", *Cell*, vol. 161, no. 6, pp. 1413-1424, 2015, is used. The data comprises two-channel spinning-disk confocal images of single yeast cells with GFP labelled proteins with localization labelled into 19 compartments. The same training, validation and test set split (with 21882, 4491 and 4516 images each) provided by Chong et al. and pre-processing provided by Kraus et al. are used.

Further, the combination and exclusion of certain compartments as described by Chong et al. From the original 19 compartments, the vacuole and vacuolar membrane compartments were combined. Dead cells, ghost cells and cells labelled as spindle re excluded. In the outlier detection example, the excluded compartments are used as outliers.

In contrast to the DeepLoc-model used by Kraus et al., in the present example, a fully convolutional classifier inspired by ResNet approach described in K. He, X. Zhang, S. Ren, and J. Sun, "Deep residual learning for image recognition", *Proceedings of the IEEE conference on computer vision and pattern recognition,* 2016, pp. 770-778, with skip-connections and pre-activations as well as Leaky ReLu activations (see A. L. Maas, A. Y. Hannun, and A. Y. Ng, "Rectifier nonlinearities improve neural network acoustic models", *Proc. icml,* 2013, vol. 30, p. 3) is used instead of regular ReLu activations.

Figure 4A:
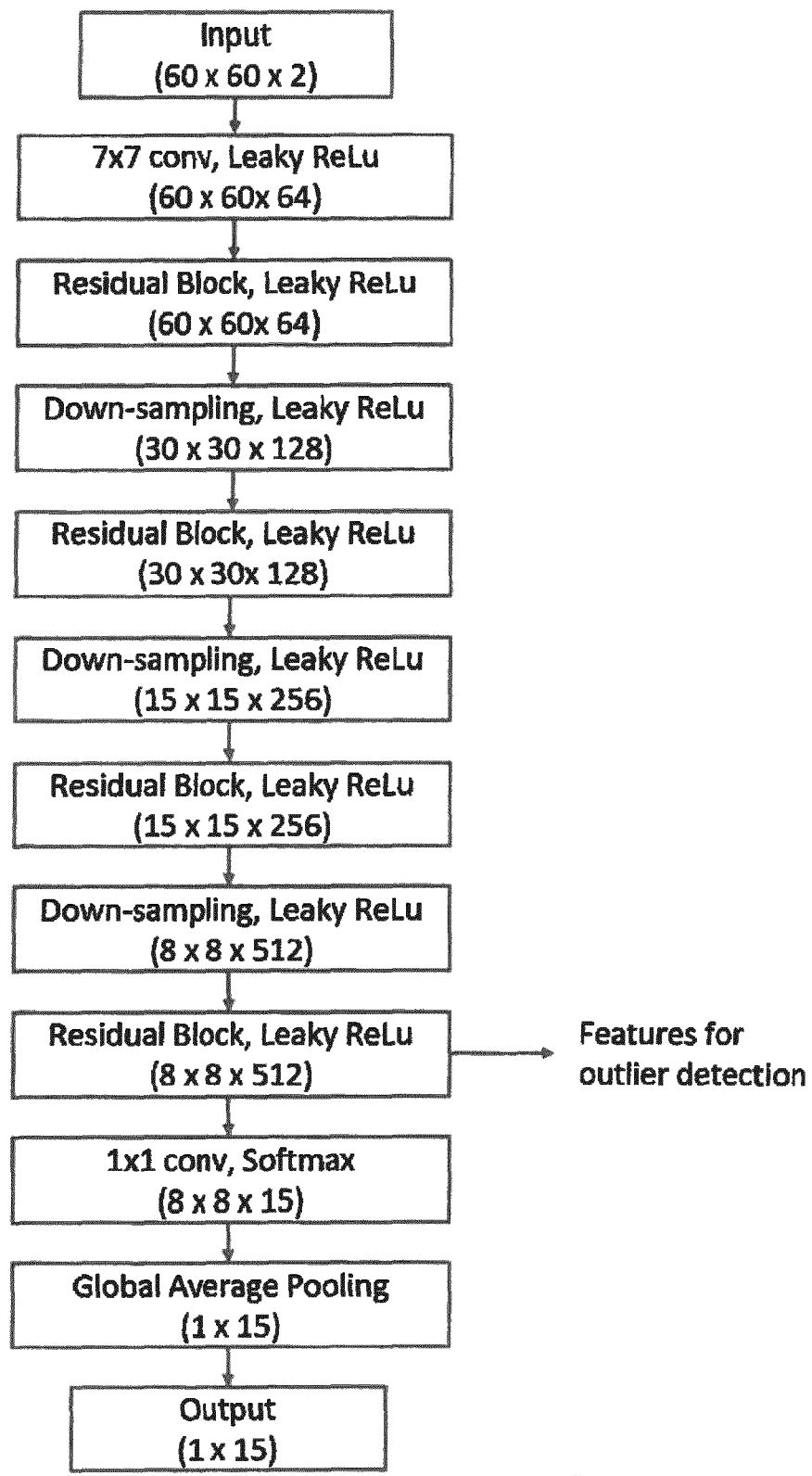
FIG. 4A shows an exemplary configuration of a convolutional neural network (CNN) for protein localization in fluorescent confocal cell images.
Figure 8A:
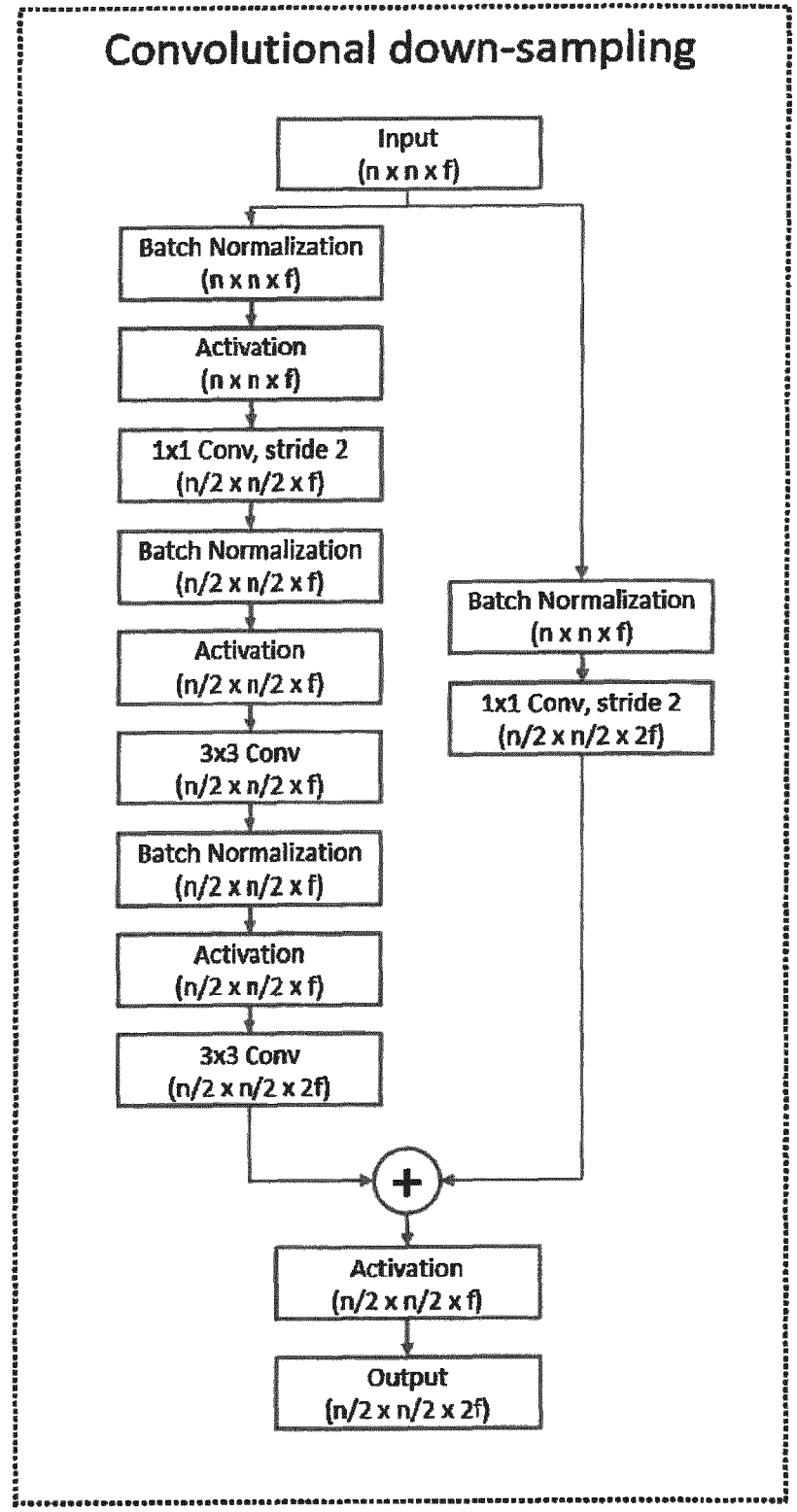
FIG. 8A shows an exemplary sub-block of operations (convolutional down-sampling) that may be performed by the protein localization network described in FIG. 4A and the "U-Net" type neural network shown in FIG. 7.

FIG. 4A shows schematically the basic architecture of the used deep neural network. The deep neural network takes an input of size n×n×f (e.g. 60×60×2), wherein f is the number of features. The deep neural network includes a first convolution layer including a 7×7 convolution followed by Leaky Relu, which increases the number of features to 64. If the input has size 60×60×2, the output of the first convolution layer has "60×60×64" values. The first convolution layer is followed by three subsequent groups of layers, each group including two layers. The first one of the two layers (residual operations layer) in the group includes a residual block (shown in FIG. 4B) followed by Leaky ReLu and produces an output that has the same size as the input to the layer. The second one of the two layers in the group (down-sampling layer) includes a down-sampling block followed by Leaky ReLu and transforms a "n×n×f" sized input into a "n/2×n/2×2f" sized output. The down-sampling may use a so called strided convolution, meaning that the convolutional operator is not applied to every pixel position in the feature map but every second position, resulting in an output feature map half the size of the input size. The number of pixel positions between every application of the convolutional operator is denoted stride and must be a positive integer. FIG. 8A shows an example of down-sampling operations constituting the down-sampling block that may be used in the network shown in FIG. 4A.

The last down-sampling layer of the groups of layers is followed by another residual operations layer including a residual block and a leaky ReLu. In case of "60×60×2" sized input to the deep neural network this layer produces a "8×8×512" sized output. After applying a global average pooling on the produced feature maps, an output of size "1×15" is produced.

Figure 4B:
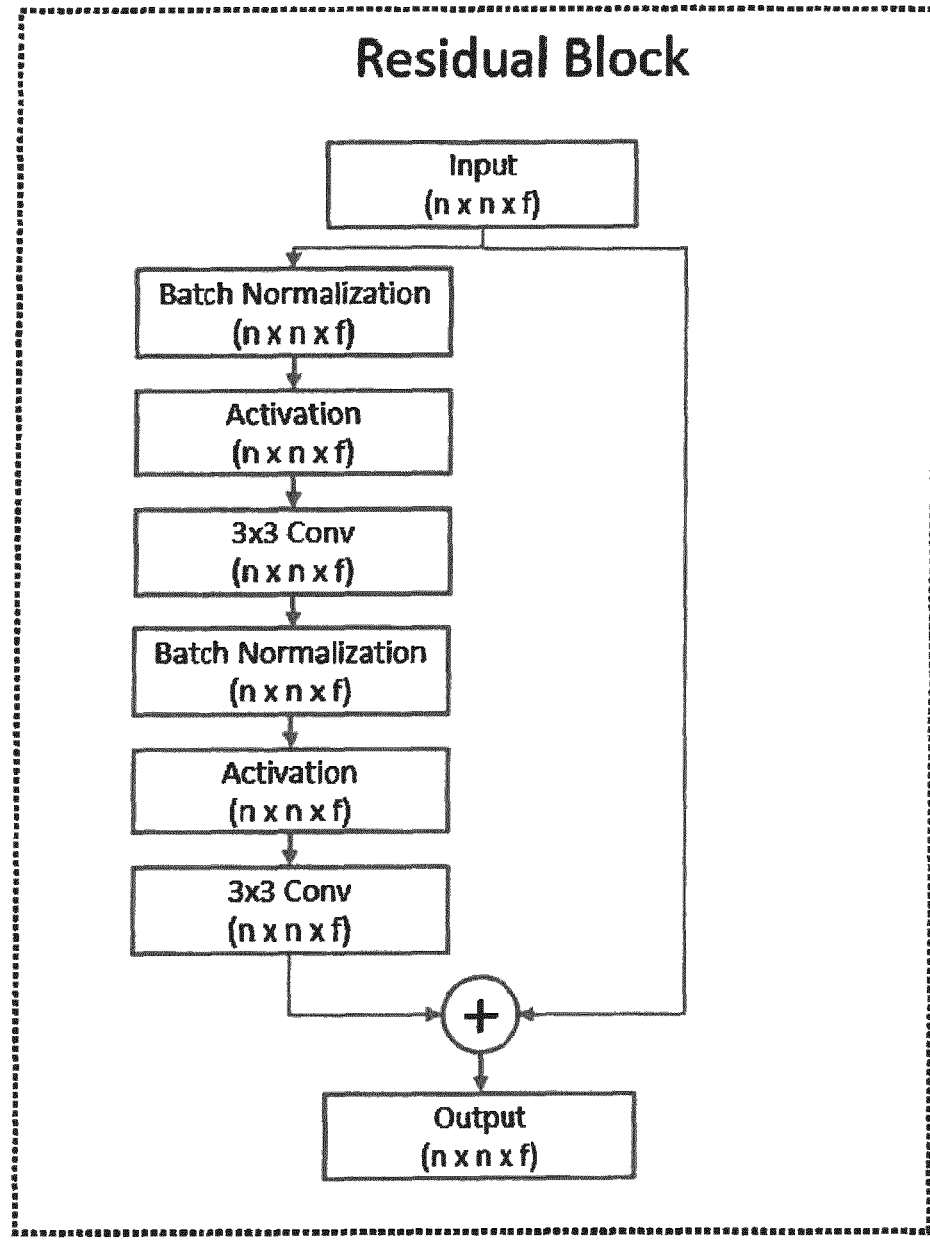
FIG. 4B shows a sub-block of operations (residual block) performed by the convolutional neural network shown in FIGS. 4A and 4B.
Figure 4B:

FIG. 4B shows the operations constituting the residual block of operations. Each residual block takes a "n×n×f" sized input and transforms it into the same sized output. The residual block includes a batch normalization, followed by two subsequent groups of operations, each group including a batch normalization, an activation and a 3×3 convolution.

The "n×n f" output of the last convolution and the "n×n×f" input are added elementwise to produce the "n×n×f" sized output of the residual block.

Data augmentation is used to improve training. The data augmentation includes random horizontal and vertical flips, up to 90 degree random rotation, up to 5 degree random sheer, up 10% random zoom as well as width and height shift, and up to 30% random channel shifts. The deep neural network was trained for 100 epochs using the categorical crossentropy as loss function to minimize and batch size 128. Further, the Adam optimizer (D. P. Kingma and J. Ba, "Adam: A Method for Stochastic Optimization", arXiv: 1412.6980 [cs], December 2014) with warm restarts (I. Loshchilov and F. Hutter, "SGDR: Stochastic Gradient Descent with Warm Restarts," arXiv:1808.03983 [cs, math], August 2016) with an initial maximal learning rate of $10^{-5}$ and minimal learning rate of $10^{-3}$, cycle length of 5, as well as 20% learning rate decay and 50% cycle length increase each cycle was used. A classification accuracy of 94.3% on the test set was achieved.

Figure 5:
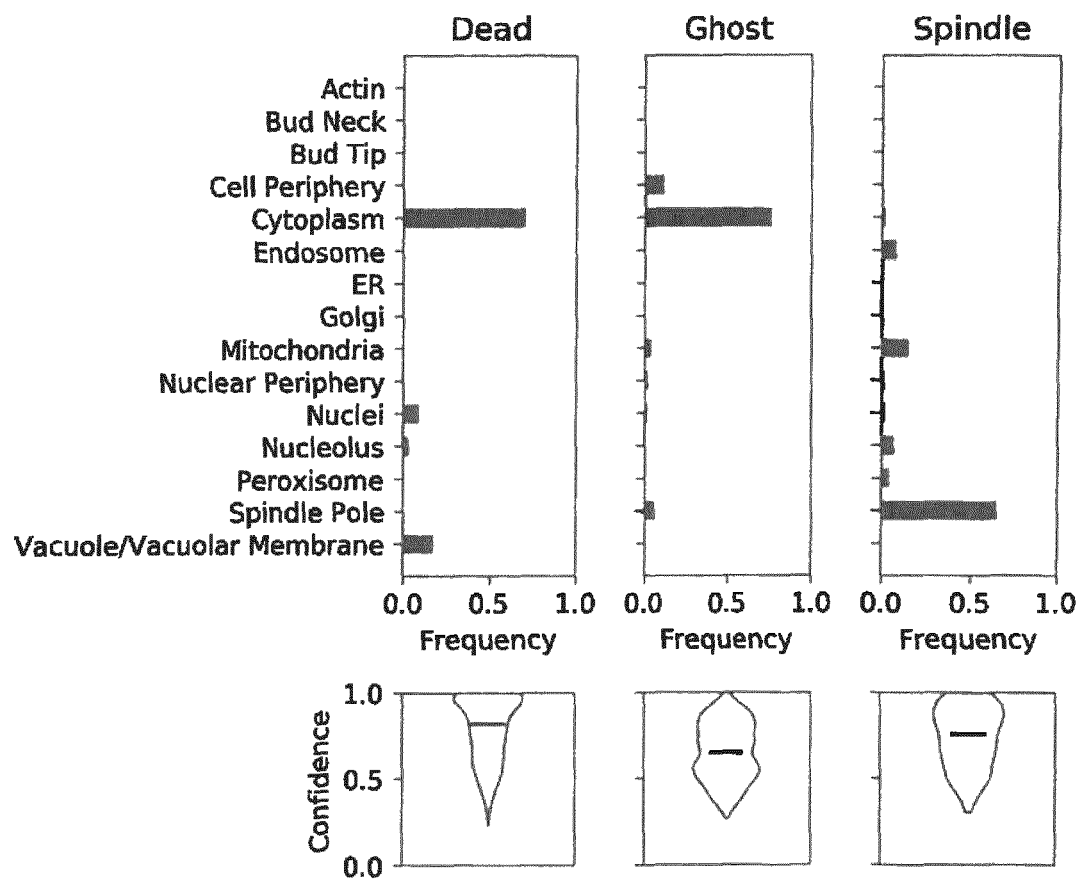
FIG. 5 shows results of protein classification using the convolutional neural network shown in FIGS. 4A and 4B.

In order to show the relevance of prediction time outlier detection, the omitted protein classes (spindle as well as dead and ghost cells) were classified using the trained deep learning neural network. FIG. 5 shows the results of the classification. The top part of FIG. 5 shows bar charts of the frequency of predicted classes. The lower part of FIG. 5 shows violin plots of prediction softmax confidence (bottom) for excluded image classes in the protein localization case study. Horizontal lines in violin plots indicate the median.

Both dead and ghost cells are predicted into cytoplasm with high confidence, although the median confidence is lower for ghost cells. Spindle images are mostly classified as spindle pole. A prediction time outlier detection was subsequently performed by using the above described latent variable model-based technique. The performance for different PCA R2 was evaluated using F1-score.

Figure 6:
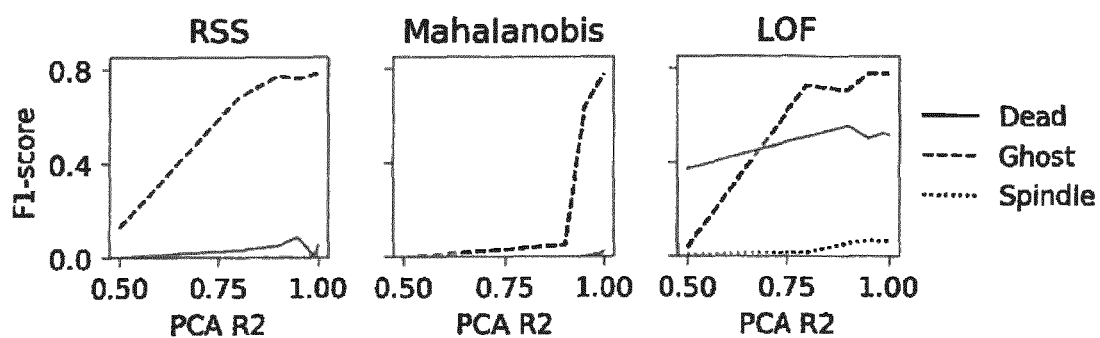
FIG. 6 shows F1-score evaluation results of outlier detection using the convolutional neural network shown in FIGS. 4A and 4B.

FIG. 6 shows the results of F1-score evaluation of the outlier detection for excluded classes in the protein localization case study. PCA R2 used for outlier detection are on the X-axes, F1-score on the Y-axes and each sub-plot shows evaluation using different distance metrics, namely residual sum-of-squares (RSS), Mahalanobis and Local Outlier Factor (see e.g., M. M. Breunig, H.-P. Kriegel, R. T. Ng, and J. Sander, "LOF: Identifying Density-based Local Outliers," in Proceedings of the 2000 ACM SIGMOD International Conference on Management of Data, New York, NY, USA, 2000, pp. 93-104).

In line with previous experiments, high PCA R2 performs best. All metrics reliably detect ghost cells as outliers at 90+% R2 (F1-score at ~0.8), while only LOF is able to detect dead cells (F1-score at ~0.5). As seen from FIG. 6, all metrics fail to detect spindle images as outliers, which is unsurprising since they are part of the same subcellular structure as the spindle pole. For comparison, the results from the method for outlier detection according to the above example were compared to the baseline method proposed by Hendrycks et al. (Hendrycks, Dan, and Kevin Gimpel. "A baseline for detecting misclassified and out-of-distribution examples in neural networks." arXiv preprint arXiv: 1610.02136 (2016)), where uncertainty is represented as the lack of confidence of a softmax-classifier. More precisely the uncertainty is represented by 1 minus the maximum softmax output for each image (1 representing maximus uncertainty). This baseline method is commonly used in practice due to its ease of implementation. Using the method based on lack of confidence using a cutoff of 0.415 corresponding to the 95$^{th}$ percentile of training set lack of confidence, outlier detection achieved F1-scores of 0.27 for dead cells, 0.52 for ghost cells and 0.24 for spindle images. Except for spindle images, the lack of confidence performs notably worse than the method for outlier detection according to the above example.

The experimental data show that using the latent variable-model based technique according to the above aspects and examples, it is possible to detect outlier classes that are confidently predicted into inlier classes in a classification study in live cell imaging. Outlier images can then be studied in more detail revealing classes that were not taken into consideration when training the model.

Example 2: Phase Contrast Image Segmentation

Example 2 relates to outlier detection in the context of image segmentation. The deep neural network 100 is a convolutional neural network trained to segment phase contrast cell images. Eight cell types (HUVEC, Jurkat, HeLa, A549, HT-1080, PC3, SKOV-3 and MDA-MB-231) were grown in 3-4 wells, each over a time period of four days. Phase contrast images were captured every 12 hours at 10× magnification at a resolution of 1500×1000px and confluence and nuclei masks were calculated using IncuCyte. One well at random was picked for each cell type as test set. To simulate outliers, all images from PC3, SKOV-3 and MDA-MB-231 were excluded from the training set.

To provide the segmentation response, the confluence and nuclei mask were combined. Further, a separate mask channel having nuclei border was calculated using morphological operators according to Ronneberger et al. (see O. Ronneberger, P. Fischer, and T. Brox, "U-Net: Convolutional Networks for Biomedical Image Segmentation", arXiv: 1505.04597 [cs], May 2015) to promote separation of neighboring nuclei. The masks were combined to provide four channel masks indicating background, cell area, nuclei and nuclei edges. The phase contrast images were preprocessed by subtracting the average phase intensity and dividing by the phase intensity standard deviation. Subsequently, the scaled phase intensities were clipped to the range −10 to +10 standard deviations, and then divided by 10 to get phase intensities in the range −1 to +1. Finally, all high-resolution phase contrast images were cropped with matching segmentation masks into 224×224px crops without overlap.

For segmentation, a fully convolutional segmentation network inspired by the U-net architecture (see O. Ronneberger, R Fischer, and T. Brox, "U-Net: Convolutional Networks for Biomedical Image Segmentation", arXiv: 1505.04597 [cs], May 2015) was trained using the test images. The U-Net network as disclosed in O. Ronnebertger et al. has two paths, a contracting path and an expansive path. The contracting path follows the architecture of a convolutional network and includes repeated application of two 3×3 convolutions (unpadded convolutions), each followed by a rectified linear unit (ReLU) and a 2×2 max pooling operation with a stride 2 for down-sampling. At each down-sampling step or, respectively, down-sampling layer the number of feature channels is doubled. Each step or layer in the expansive part includes an up-sampling of the feature map followed by a 2×2 convolution ("up-convolution") that halves the number of feature channels, a concatenation with the correspondingly cropped feature map from the contracting path, and two 3×3 convolutions, each followed by a ReLu operation.

In contrast to the original U-net architecture described in O. Ronneberger et al., skip-connections, pre-activations and batch normalization were employed, similar to the original ResNet (He, Kaiming, et al. "Deep residual learning for image recognition." *Proceedings of the IEEE conference on computer vision and pattern recognition.* 2016). Further, Leaky ReLu activations with α=0.3 (A. L. Maas, A. Y. Hannun, and A. Y. Ng, "Rectifier nonlinearities improve neural network acoustic models," in *Proc. icml,* 2013, vol. 30, p. 3) instead of regular ReLu-activations.

Figure 7:
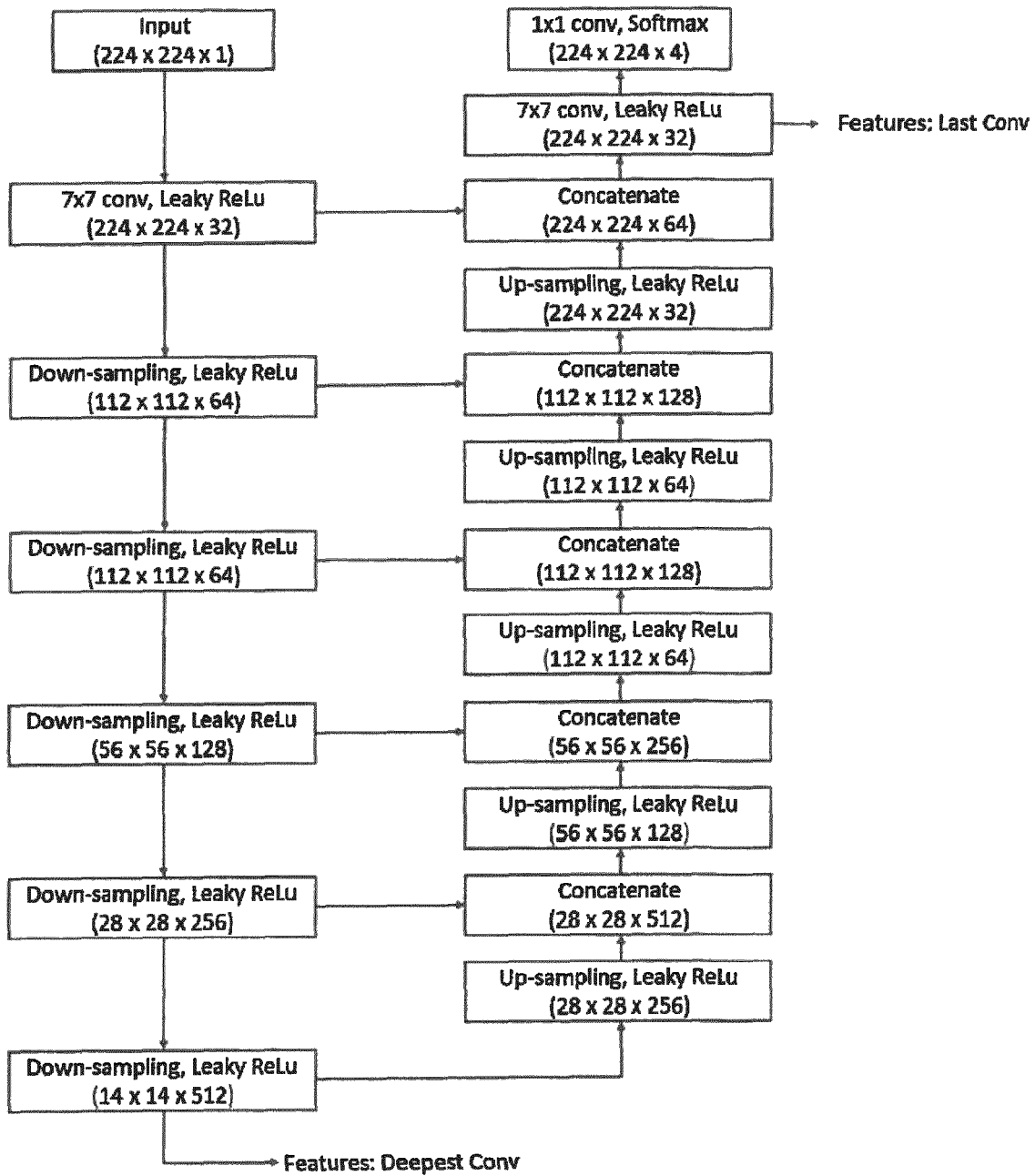
FIG. 7 shows an exemplary configuration of a "U-Net" type deep neural network for phase contrast image segmentation.
Figure 8B:
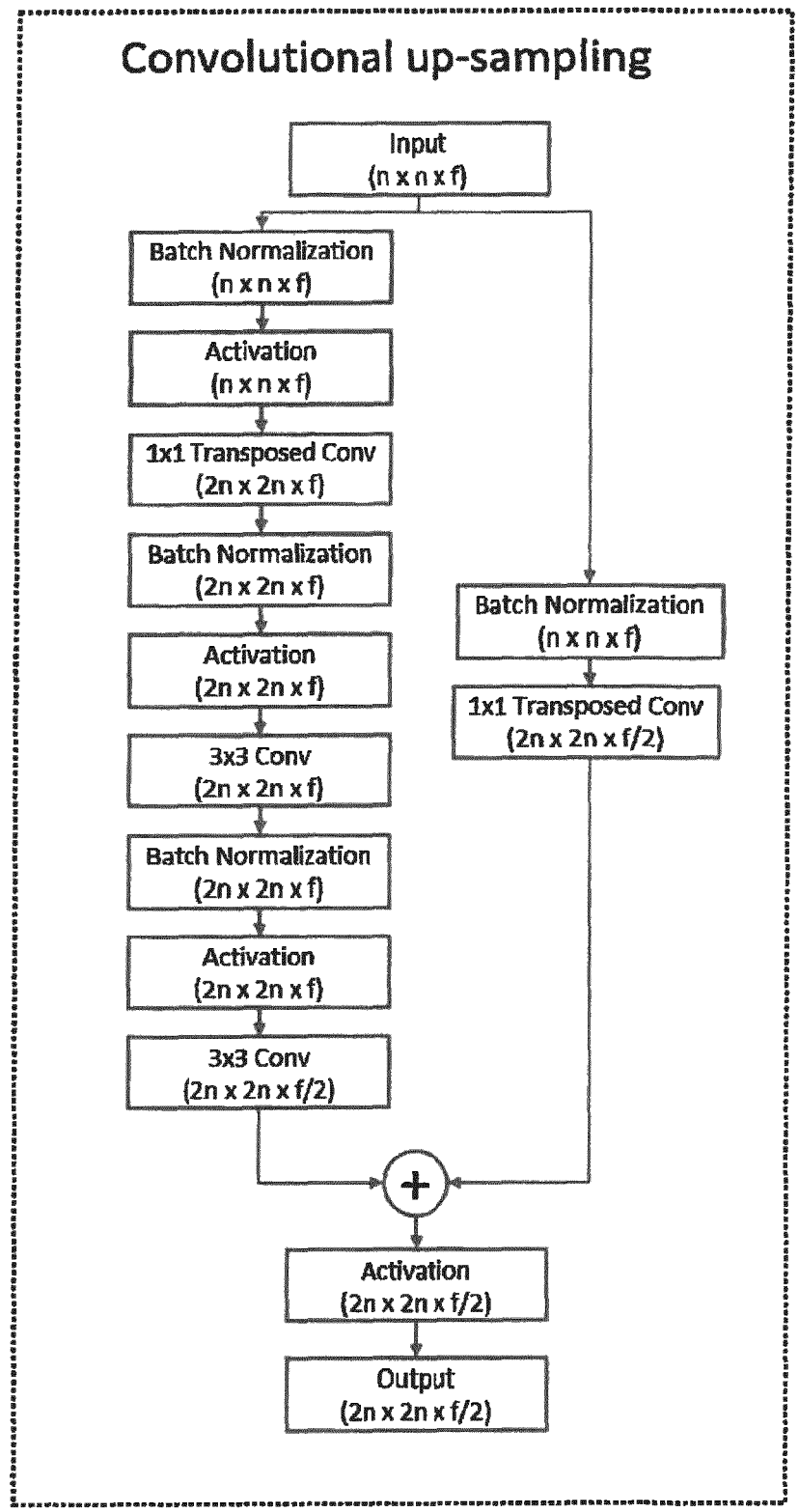
FIG. 8B shows a sub-block of operations (convolutional up-sampling) performed by the "U-Net" type neural network shown in FIG. 7.

FIG. 7 shows schematically the architecture of the employed deep neural network. FIG. 8A shows the convolutional down-sampling block and FIG. 8B shows the convolutional up-sampling block.

As explained above, the employed deep neural network is of U-Net type and has two paths, a contracting path and an expansive path. The contracting path comprises a first convolution layer including a 7×7 convolution followed by Leaky Relu, which increases the number of features to 32. If the input is an image of 224×224 pixels, the output of the first layer has "224×224×32" values, which may be regarded as a set of 32 images, each of 224×224 pixels. The first layer is followed by 5 other layers (encoding layers), each of them taking a "n×n×f" sized input and producing a "n/2×n/2×2f" sized output. The output of one layer corresponds to the input to the subsequent layer. Each of the 5 encoding layers includes a down-sampling block followed by Leaky ReLu operation. The down-sampling block is shown in FIG. 8A. The down-sampling block takes a "n×n×f" sized input and applies a number of operations to produce a "n/2×n/2×2f" sized output. The operations include a batch normalization, followed by an activation, a 1×1 convolution with a stride 1 for down-sampling and two blocks of operations, each block consisting of a batch normalization, an activation and a 3×3 convolution. The downsampled result of the last 3×3 convolution of size "n/2×n/2×2f" is added elementwise to the output of a group of operations applied to the "n×n×f" input, the group of operations including a batch normalization followed by a 1×1 convolution with a stride 2 to produce the "n/2×n/2×2f" output. An activation is applied to the result of the elementwise addition.

The expansive part includes 5 decoding layers, each including an up-sampling block and Leaky ReLu. Each decoding layer is followed by a concatenation with the correspondingly cropped feature map from the contracting path, as shown in FIG. 7. The last concatenation is followed by an additional convolution layer including a 7×7 convolution and Leaky Relu. Following the additional layer is an output layer including a 1×1 convolution and softmax operation, thereby producing a "224×224×4" sized output.

Each of the decoding layers takes a "n×n×f" sized input, which is subjected to a number of operations to produce a "2n×2n×f/2" sized output. FIG. 8B shows the up-sampling block included in each decoding layer. The operations included in each upsampling block include a batch normalization, followed by an activation, a 1×1 transposed convolution for up-sampling and two blocks, each consisting of a batch normalization, activation and a 3×3 convolution. The upsampled result (size "2n×2n×f/2") of the last 3×3 convolution is added elementwise to the output of a group of operations applied on the "n×n×f" sized input, the group of operations including a batch normalization and a 1×1 transposed convolution to produce the "2n×2n×f/2" sized output. An activation is applied to the result of the elementwise addition.

To decrease the risk of overfitting, data augmentation was employed, including random horizontal and vertical flipping, up to 20 degrees of random rotation, up to 20% vertical and horizontal shifts, up to 10 degrees of random shears and 10% random zoom. The deep neural network was trained for 25 epochs with a batch size 8. Similar to Ronneberger et al, the Dice coefficient loss was used, however, the sum of channel-wise Dice coefficient losses instead of a single channel loss was optimized. The employed optimizer is the Adam optimizer (see I. Loshchilov and F. Hutter, "SGDR: Stochastic Gradient Descent with Warm Restarts", arXiv: 1608.03983 [cs, math], August 2016) with warm restarts as described in O. Ronneberger, P. Fischer, and T. Brox, "U-Net: Convolutional Networks for Biomedical Image Segmentation", arXiv:1505.04597 [cs], May 2015, with maximum learning rate of $10^{-3}$ and minimal learning rate of $10^{-6}$, starting cycle length of 5 epochs, increasing the cycle length with 50% and decreasing the maximum learning rate by 10% each cycle. After training, a pixel-wise accuracy of 92.2% on the test set images and 87.3% on the excluded cell types was achieved.

Figure 9:
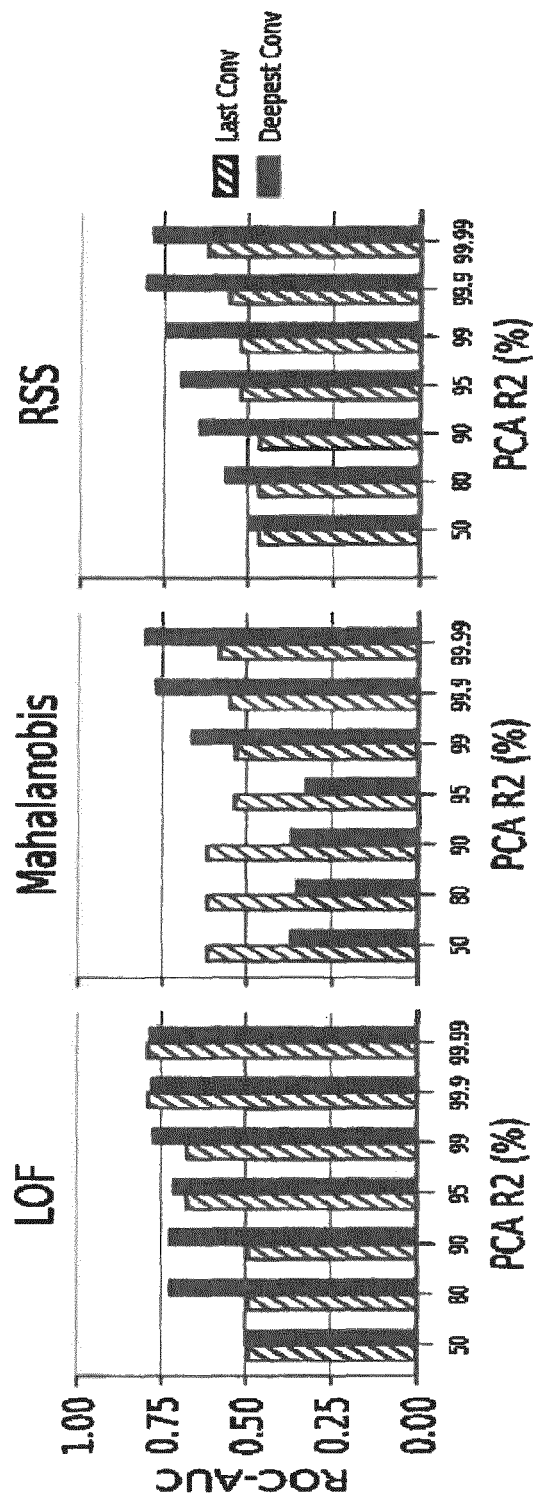
FIG. 9 shows ROC-AUC evaluation of outlier detection performance using different distance metrics.

To detect outliers, a latent variable model was fitted using both the deepest encoding layer (14×14×512 down-sampling output) and the last convolutional layer before the output softmax layer. Different models were fitted using different levels of PCA R2 (50-99.99%) and distance metrics (RSS, Mahalanobis and LOF). The results were evaluated using ROC-AUC of separating test set images from outlier images. The results of the tests are summarized in FIG. 9. In this example, the deepest encoding features give the most consistent results and the last level features are only comparable when LOF is used as distance metric. Consistent with earlier results, the best results are achieved using a high PCA R2 (99.9 or 99.99%). The fact that outliers are not more strongly separated from test set images may be explained by the fact that the outlier classes simply are not more different from the training set images. This is supported by the fact that the segmentation accuracy is still quite high for excluded cell types (87.3% compared to test set 92.2%).

This experimental data show that the method for detecting outliers according to aspects and examples as stated above, which uses latent variable based technique, is able to reliably detect outliers not only in classification tasks, but in segmentation tasks using complex fully convolutional neural networks as well.

Other Examples

Another exemplary method for analysis of cell images includes the following steps:

S101: Provided are images from a cell imaging device, for instance a microscope. These images constitute the training set.

S102: Train a deep neural network or fine-tune a pre-trained one. The deep neural network may be a convolutional neural network.

S103: Choose one or more layers of the deep neural network and calculate the activations of the images from that/those layers.

S103a: Optionally, if activations are from feature maps, apply global pooling across each feature map, for instance global average pooling.

S104: Fit a latent variable model on the (optionally pooled) training set activations.

S105: Use the latent variable model to calculate one or more set of distances of the training set images.

S106: Select a threshold based on the distances of the training set images, for instance $95^{th}$ percentile of training set distances.

S107: Deploy the deep neural network. In other words, incorporate the deep neural network in the software used to process the cell images. The software may be implemented within the imaging device itself, or as a stand-alone software for analysis.

S108: Calculate the deep neural network predictions for the new images

S109: Decide if a specific new image is an outlier image by performing the following steps:

S109a: Calculate activations of the layer(s) used for fitting the latent variable model in S105. Optionally global pooling may be applied;

S109b: Use the activations from S109a and the latent variable model in S105 to calculate the distance(s) to the model;

S109c: Compare the distance(s) from S109b to the threshold distance from S106;

i. If the distance of S109c is greater than the threshold in S106, the new image is considered an outlier. Application-specific action is subsequently taken. For instance, the end user may be warned to analyze the outlier manually before proceeding. The deep neural network prediction from S108 may be ignored and the outlier image discarded.

ii. If the distance of S109c is not greater than the threshold in S106, the new image is not considered an outlier and the prediction from S108 is accepted.

Variations

In some of the above examples, a convolutional neural network (CNN) was used. However, the deep neural network 100 is not restricted to a convolutional neural network, but may be any type of neural network, for example recurrent neural network, recursive neural network, transformer neural network, etc.

In some of the above examples, activations from a single hidden layer are used for performing the outlier detection.

In some other examples, activations from two or more hidden layers may be used for performing the outlier detection. For instance, in order to avoid the difficulty in selecting which layer to use for outlier detection, the measures from all (hidden) layers may be combined using Gaussian Kernel Density estimation, which have been used to detect outliers (see e.g., L. J. Latecki, A. Lazarevic, and D. Pokrajac, "Outlier Detection with Kernel Density Functions," in Machine Learning and Data Mining in Pattern Recognition, 2007, pp. 61-75; E. Schubert, A. Zimek, and H. Kriegel, "Generalized Outlier Detection with Flexible Kernel Density Estimates," in Proceedings of the 2014 SIAM International Conference on Data Mining, 0 vols., Society for Industrial and Applied Mathematics, 2014, pp. 542-550). Kernel density estimations can be calculated separately for training set Mahalanobis-distances and residual sum of squares, but combining all layers. The probabilities of each image can be approximated under the resulting kernel density functions using Monte Carlo integration. The outlier detection performance can be evaluated in the same manner as in the experiments described above.

In further examples, when integrating several embeddings (e.g., activations from several layers) a bagging approach (see e.g., A. Lazarevic and V. Kumar, "Feature Bagging for Outlier Detection," in Proceedings of the Eleventh ACM SIGKDD International Conference on Knowledge Discovery in Data Mining, New York, NY, USA, 2005, pp. 157-166) may be used instead of direct kernel density.

Further, it may be possible to use other methodologies on learned representations, GMM one-class SMV, clustering, etc.

Further, in various embodiments and examples described herein, instead of using simple measure such as Mahalanobis distance, a more localized measures such as Local Outlier Factor or LOF (see e.g., M. M. Breunig, H.-P. Kriegel, R. T. Ng, and J. Sander, "LOF: Identifying Density-based Local Outliers," in Proceedings of the 2000 ACM SIGMOD International Conference on Management of Data, New York, NY, USA, 2000, pp. 93-104) may be applied directly in PCA space. In principle, any suitable distance metric or a combination of distance metrics may be used, such as compound metric Distance to Modelled Embedding, sum of squares, Local Outlier Factor, etc.

As described above, there may be various applications of the methods and systems as described herein. One of the possible applications may be phase microscopy image analysis. The task of identifying nuclei from phase contrast images is challenging and typically relies on fluorescent markers binding to nuclei to provide an extra image channel highlighting locations of nuclei. By applying deep CNN, a model may be generated and trained that segments background from cells as well as identifies nuclei of cells from phase contrast images without using fluorescence labels. If the CNN is trained on phase contrast images from multiple cell types, the CNN may also identify new previously unseen cell types. In order to determine when unseen cell types are too different from the cell types used for CNN training, prediction time outlier detection may be applied. If phase microscopy images from new cell types are detected as outliers, the user may receive a warning that the CNN's separation of cell and background as well as detection of nuclei are unreliable. In this case, the CNN system provided may send a signal that the CNN model needs to be re-trained in order to reliably separate cells from background and identify nuclei from phase contrast images for the new cell type.

Hardware Configuration

Figure 10:
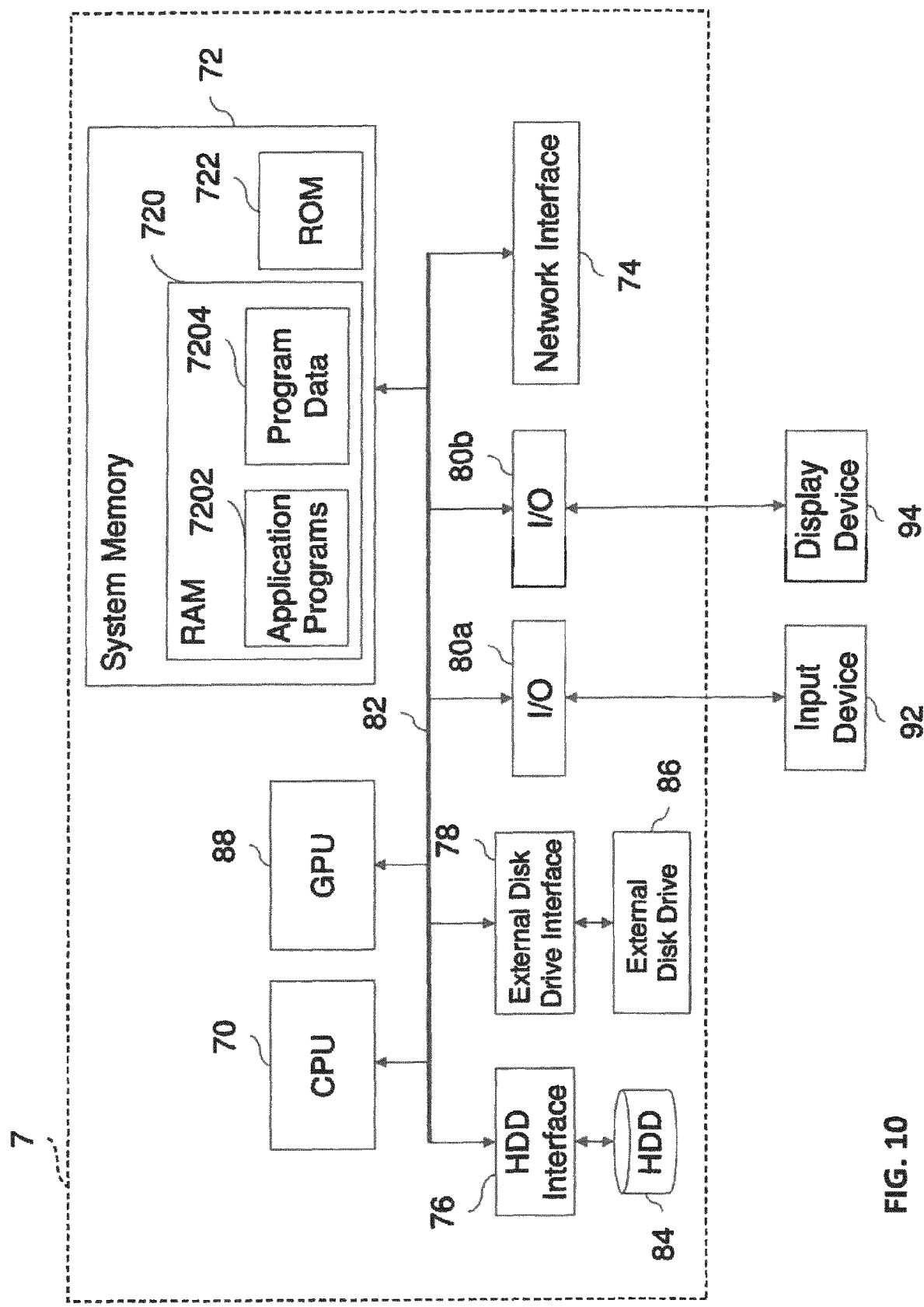
FIG. 10 shows an exemplary hardware configuration of a computer that may be used to implement at least a part of the system described herein.

FIG. 10 shows an exemplary hardware configuration of a computer that may be used to implement at least a part of the computing system 1 and/or perform the method as described above. The computer 7 shown in FIG. 10 includes a central processing unit (CPU) 70, a graphics processing unit (GPU) 88, a system memory 72, a network interface 74, a hard disk drive (HDD) interface 76, an external disk drive interface 78 and input/output (I/O) interfaces 80. These components of the computer are coupled to each other via a system bus 82. The CPU 70 may perform arithmetic, logic and/or control operations by accessing the system memory 72. The GPU 88 may perform processing concerning graphic images and/or matrix operations required for deep learning. The GPU 88 may comprise a plurality of processors (e.g. cores) that can perform parallel processing, which may lead to higher performance of the computing system 1. The CPU 70 and/or GPU 88 may implement the processors of the exemplary devices and/or system described above. In some examples, however, the computer 7 does not necessarily comprise the GPU 88. The system memory 72 may store information and/or instructions for use in combination with the CPU 70. The system memory 72 may include volatile and non-volatile memory, such as a random access memory (RAM) 720 and a read only memory (ROM) 722. A basic input/output system (BIOS) containing the basic routines that helps to transfer information between elements within the computer 7, such as during start-up, may be stored in the ROM 722. The system bus 82 may be any of several types of bus structures including a memory bus or memory controller, a peripheral bus, and a local bus using any of a variety of bus architectures. The CPU 70 may be further connected to one or more sensors (not shown) via one or more corresponding interfaces (not shown) and the bus 82. The sensors may measure physical conditions or states including but not limited to: temperature, pH, pressure, etc. Additionally, the sensors may include other types of measuring or detecting devices including but not limited to imaging devices, microphones, spectral sensors, etc. Controllers may control a physical condition or state including but not limited to: temperature, flux, stirring, etc.

The computer may include a network interface 74 for communicating with other computers and/or devices via a network.

Further, the computer may include a hard disk drive (HDD) 84 for reading from and writing to a hard disk (not shown), and an external disk drive 86 for reading from or writing to a removable disk (not shown). The removable disk may be a magnetic disk for a magnetic disk drive or an optical disk such as a CD ROM for an optical disk drive. The HDD 84 and the external disk drive 86 are connected to the system bus 82 by a HDD interface 76 and an external disk drive interface 78, respectively. The drives and their associated computer-readable media provide non-volatile storage of computer-readable instructions, data structures, program modules and other data for the general purpose computer. The data structures may include relevant data for the implementation of the exemplary method and its variations as described herein. The relevant data may be organized in a database, for example a relational or object database.

Although the exemplary environment described herein employs a hard disk (not shown) and an external disk (not shown), it should be appreciated by those skilled in the art that other types of computer readable media which can store data that is accessible by a computer, such as magnetic cassettes, flash memory cards, digital video disks, random access memories, read only memories, and the like, may also be used in the exemplary operating environment.

A number of program modules may be stored on the hard disk, external disk, ROM 722 or RAM 720, including an operating system (not shown), one or more application programs 7202, other program modules (not shown), and program data 7204. The application programs may include at least a part of the functionality as described above.

The computer 7 may be connected to an input device 92 such as mouse and/or keyboard and a display device 94 such as liquid crystal display, via corresponding I/O interfaces 80a and 80b as well as the system bus 82. In case the computer 7 is implemented as a tablet computer, for example, a touch panel that displays information and that receives input may be connected to the computer 7 via a corresponding I/O interface and the system bus 82. Further, in some examples, although not shown in FIG. 18, the computer 7 may further be connected to a printer and/or an imaging device such as a camera, via corresponding I/O interfaces and the system bus 82.

In addition or as an alternative to an implementation using a computer 7 as shown in FIG. 18, a part or all of the functionality of the exemplary embodiments described herein may be implemented as one or more hardware circuits. Examples of such hardware circuits may include but are not limited to: Large Scale Integration (LSI), Reduced Instruction Set Circuits (RISC), Application Specific Integrated Circuit (ASIC) and Field Programmable Gate Array (FPGA).

Below are some typical scenarios in which the various aspects and examples stated above may be used:

A lab with a cell-imaging platform. Coupled to the imaging platform is deep learning-based software that performs segmentation of cells and background as well as detection of nuclei. Images are collected at a very large scale meaning that not every image can be controlled manually. Due for example to issues with the imaging technology, the cell-imaging platform may fail to put the cells in focus for some images. The outlier detection module which may be a part of the deep learning-based software detects that there is some issue with these out-of-focus images and issues a respective alert to a user (e.g. an operator). The problematic images may be shown to the user, who may then take a respective action, for example to remove them from the analysis. It is also possible to automatically remove the problematic images from the analysis. Without the outlier detection module, the problems with the images would have not been detected, which may potentially result in an erroneous analysis.

A lab with cell-imaging and deep learning-based so are as above. The underlying deep learning model is trained on a set of different cell types. Now the user wants to analyze images of new previously not used cell types. The outlier detection module allows the deep learning module to detect and the system to alert the user when the new cell types are too dissimilar to the cell types u during training to be used safely.

| | Glossary |
|---|---|
| ASIC | Application Specific Integrated Circuit |
| BIOS | basic input/output system |
| CD ROM | Compact Disc Read-Only Memory |
| CNN | convolutional neural network |
| CPU | central processing unit |
| DNN | deep neural network |
| GPU | graphics processing unit |
| FPGA | Field Programmable Gate Array |
| HDD | hard disk drive |
| HTTP | hypertext transfer protocol |
| I/O | input/output |
| LSI | Large Scale Integration |
| LOF | Local Outlier Factor |
| MC-dropout | Monte Carlo dropout |
| PCA | Principal Component Analysis |
| RAM | random access memory |
| ReLu/Relu | rectified linear unit |
| RISC | Reduced Instruction Set Circuits |
| ROC-AUC | Receiver-Operating-Characteristic Area-Under-Curve |
| ROM | read only memory |
| RSS | residual sum of squares |
| SSH | Secure Shell |

The invention claimed is:

1. A computer-implemented method for analysis of cell images, comprising:
obtaining a deep neural network (100) and at least a part of a training dataset used for training the deep neural network, the deep neural network comprising a plurality of hidden layers and being trained by using the training dataset, the training dataset including a plurality of possible cell images that can be input to the deep neural network;
obtaining first sets of intermediate output values that are output from at least one of the plurality of hidden layers, each of the first sets of intermediate output values obtained by inputting a different one of the possible cell images included in said at least a part of the training dataset;

constructing/fitting a latent variable model using the first sets of intermediate output values, the latent variable model providing a mapping of the first sets of intermediate output values to first sets of projected values in a sub-space that has a dimension lower than a dimension of the sets of the intermediate outputs;

receiving a new cell image to be input to the deep neural network; and storing the latent variable model and the first sets of projected values in a storage medium.

2. A computer-implemented method comprising:

receiving a new cell image to be input to a deep neural network (100), the deep neural network having a plurality of hidden layers and being trained using a training dataset that includes possible cell images that can be input to the deep neural network;

obtaining a second set of intermediate output values that are output from at least one of the plurality of hidden layers of the deep neural network by inputting the received new cell image to the deep neural network;

mapping, using a latent variable model stored in a storage medium, the second set of intermediate output values to a second set of projected values; and determining whether or not the received new cell image is an outlier with respect to the training dataset based on the latent variable model and the second set of projected values, wherein the latent variable model stored in the storage medium is constructed by:

obtaining first sets of intermediate output values that are output from said one of the plurality of hidden layers of the deep neural network, each of the first sets of intermediate output values obtained by inputting a different one of the possible cell images included in said at least a part of the training dataset; and constructing the latent variable model using the first sets of intermediate output values, the latent variable model providing a mapping of the first sets of intermediate output values to first sets of projected values in a sub-space of the latent variable model that has a dimension lower than a dimension of the sets of the intermediate outputs.

3. The computer-implemented method for analysis of cell images according to claim 1, further comprising:

obtaining a second set of intermediate output values that are output from said at least one of the plurality of hidden layers of the deep neural network by inputting the received new cell image to the deep neural network;

mapping, using the latent variable model, the second set of intermediate output values to a second set of projected values; and determining whether or not the received new cell image is an outlier with respect to the training dataset based on the latent variable model and the second set of projected values.

4. The method according to claim 2, wherein said step of determining whether or not the received new cell image is an outlier comprises:

determining a distance of the second set of projected values with respect to a distribution of the first sets of projected values; and determining that the received new cell image is an outlier with respect to the training dataset if the calculated distance is larger than a threshold value for the determined distance.

5. The method according to claim 4, wherein the threshold value for the distance is determined based on distances, each of which being calculated for a different one of the first sets of projected values with respect to the distribution of the first sets of projected values.

6. The method of claim 4, wherein the distance is one of a compound distance, residual sum of squares, Mahalanobis distance or Local Outlier Factor.

7. The method according to claim 2, wherein said step of determining whether or not the received new cell image is an outlier comprises:

determining an approximate set of intermediate output values corresponding to the second set of intermediate output values, using the latent variable model and the second set of projected values;

calculating a squared approximation residual for the second set of intermediate output values and the approximate set of intermediate output values; and determining that the received observation is an outlier with respect to the training dataset if the calculated squared approximation residual is larger than a threshold value for the squared approximation residual.

8. The method according to claim 7, wherein the threshold value for the squared approximation residual is determined based on squared approximation residuals, each of which is calculated for a different one of the first sets of intermediate output values and an approximate set of intermediate output values corresponding to said one of the first sets of intermediate output values.

9. The method according to claim 2, wherein the steps of obtaining the first sets of intermediate output values and constructing the latent variable model are performed for two or more of the plurality of hidden layers;

wherein the steps of obtaining the second set of intermediate output values and mapping the second set of intermediate output values to the second set of projected values are performed concerning said two or more of the plurality of hidden layers; and wherein, the step of determining whether or not the received new cell image is an outlier is performed based on the latent variable model and the second sets of projected values obtained concerning said two or more of the plurality of hidden layers.

10. The method according to claim 2, wherein the step of obtaining the intermediate output values that are output from at least one of the plurality of hidden layers of the deep neural network comprises determining activations from the at least one of the plurality of hidden layers and optionally applying a global pooling on the determined activations.

11. The method according to claim 2, wherein the latent variable model is constructed according to principal component analysis or using an autoencoder.

12. The method of claim 2, further comprising:

calculating, by the deep neural network, a prediction for the new cell image; and if the new cell image is determined to be outlier, discarding the prediction; and if the new cell image is determined not to be outlier, accepting the prediction.

13. A computer program product comprising computer-readable instructions embodied on one or more non-transitory computer-readable media that, when loaded and run on a computer, cause the computer to perform a method comprising:

receiving a new cell image to be input to a deep neural network, the deep neural network having a plurality of hidden layers and being trained using a training dataset that includes possible cell images that can be input to the deep neural network;

obtaining a second set of intermediate output values that are output from at least one of the plurality of hidden layers of the deep neural network by inputting the received new cell image to the deep neural network;

mapping, using a latent variable model stored in a storage medium, the second set of intermediate output values to a second set of projected values; and determining whether or not the received new cell image is an outlier with respect to the training dataset based on the latent variable model and the second set of projected values, wherein the latent variable model stored in the storage medium is constructed by:

obtaining first sets of intermediate output values that are output from said one of the plurality of hidden layers of the deep neural network, each of the first sets of intermediate output values obtained by inputting a different one of the possible cell images included in said at least a part of the training dataset; and constructing the latent variable model using the first sets of intermediate output values, the latent variable model providing a mapping of the first sets of intermediate output values to first sets of projected values in a sub-space of the latent variable model that has a dimension lower than a dimension of the sets of the intermediate outputs.

14. A system for data analysis, the system comprising:

a storage medium (12) storing a training dataset used for training a deep neural network (100), the deep neural network comprising a plurality of hidden layers and being trained using the training dataset, the training dataset including possible cell images that can be input to the deep neural network; and a processor configured to perform a method for analysis of cell images, comprising:

obtaining the deep neural network and at least a part of the training dataset used for training the deep neural network;

obtaining first sets of intermediate output values that are output from at least one of the plurality of hidden layers, each of the first sets of intermediate output values obtained by inputting a different one of the possible cell images included in said at least a part of the training dataset;

constructing/fitting a latent variable model using the first sets of intermediate output values, the latent variable model providing a mapping of the first sets of intermediate output values to first sets of projected values in a sub-space that has a dimension lower than a dimension of the sets of the intermediate outputs;

receiving a new cell image to be input to the deep neural network; and storing the latent variable model and the first sets of projected values in a storage medium.

\* \* \* \* \*